United States Patent
Fukushima et al.

(10) Patent No.: US 8,525,816 B2
(45) Date of Patent: Sep. 3, 2013

(54) POSITION POINTER, VARIABLE CAPACITOR AND INPUTTING APPARATUS

(75) Inventors: Yasuyuki Fukushima, Kitakatsushika-gun (JP); Hiroyuki Fujitsuka, Kitakatsushika-gun (JP)

(73) Assignee: Wacom Co., Ltd., Saitama (JP)

( * ) Notice: Subject to any disclaimer, the term of this patent is extended or adjusted under 35 U.S.C. 154(b) by 877 days.

(21) Appl. No.: 12/703,590

(22) Filed: Feb. 10, 2010

(65) Prior Publication Data

US 2011/0192658 A1 Aug. 11, 2011

(51) Int. Cl.
G09G 5/00 (2006.01)

(52) U.S. Cl.
USPC ........... 345/179; 345/156; 345/157; 345/169; 178/18.01; 178/19.03

(58) Field of Classification Search
USPC ... 345/156, 157, 179, 169; 178/18.01–18.09, 178/19.01–19.03
See application file for complete search history.

(56) References Cited

U.S. PATENT DOCUMENTS

| | | | | |
|---|---|---|---|---|
| 5,206,785 A | * | 4/1993 | Hukashima | 361/283.2 |
| 5,557,497 A | * | 9/1996 | Ivanov et al. | 361/502 |
| 6,801,192 B2 | * | 10/2004 | Fujitsuka et al. | 345/179 |
| 7,696,444 B2 | | 4/2010 | Liu et al. | |
| 2001/0038384 A1 | * | 11/2001 | Fukushima et al. | 345/179 |
| 2007/0180923 A1 | | 8/2007 | Liu et al. | |
| 2007/0195068 A1 | * | 8/2007 | Kable et al. | 345/179 |

FOREIGN PATENT DOCUMENTS

| | | |
|---|---|---|
| JP | 63070326 A | 3/1988 |
| JP | 4096212 A | 3/1992 |
| JP | 575828 U | 10/1993 |
| JP | 2006163798 A | 6/2006 |
| JP | 2007201464 A | 8/2007 |

OTHER PUBLICATIONS

Japanese Office Action dated Dec. 18, 2013, for corresponding JP Application No. 2008-305556, 2 pages.

* cited by examiner

Primary Examiner — Quan-Zhen Wang
Assistant Examiner — Jennifer Nguyen
(74) Attorney, Agent, or Firm — Seed IP Law Group PLLC

(57) ABSTRACT

A position pointer is provided, which includes a housing having an opening, a bar-like rod disposed in the housing such that one end thereof projects from the opening, and a variable capacitor having a capacitance value which varies in response to pressure applied thereto through the rod. The capacitor includes a dielectric member having a first face portion opposite a second face portion, a first electrode section disposed on the first face portion of the dielectric member, a conductive member facing the second face portion of the dielectric member and forming a second electrode section when brought into contact with the second face portion of the dielectric member, and an elastic member coupled with the conductive member and adapted for biasing the conductive member away from the second face portion. A contact area between the conductive member and the second face portion varies depending on the pressure applied thereto through the rod.

13 Claims, 25 Drawing Sheets

POSITION POINTER, VARIABLE CAPACITOR AND INPUTTING APPARATUS

BACKGROUND OF THE INVENTION

1. Field of the Invention

This invention relates to a position pointer suitable for use for detection of writing pressure, a variable capacitor for detecting the writing pressure, and an inputting apparatus which includes the position pointer.

2. Description of the Related Art

In recent years, inputting apparatuses have been used as an inputting device for computing devices, such as personal computers and so forth. A typical inputting apparatus includes a position pointer formed, for example, like a pen, and a position detection apparatus having an input face which receives a pointing operation or inputting of characters, figures, and so forth thereto using the position pointer.

A variable capacitor, disclosed, for example, in Japanese Patent Laid-Open No. H4-96212 (hereinafter referred to as Patent Document 1), is used in a writing pressure detection section of the position pointer. The variable capacitor disclosed in Patent Document 1 includes a first electrode attached to a first face of a dielectric member and a second flexible electrode disposed on a second face side of the dielectric member. The variable capacitor further includes means for spacing the second electrode away from the second face of the dielectric member at a small distance, and means for applying relative pressure or displacement between the second electrode and the dielectric member.

FIGS. 26A and 26B show a particular configuration of the conventional variable capacitor. More particularly, FIG. 26A shows the variable capacitor in an initial state, and FIG. 26B shows the variable capacitor in a state when pressure is applied thereto.

Referring to FIGS. 26A and 26B, the variable capacitor 200 includes a dielectric member 201 substantially shaped as a disk, a first electrode 202 attached to the first face 201a of the dielectric member 201, and a second electrode 203. The second electrode 203 has flexibility and is disposed on the second face 201b side of the dielectric member 201 with a ring-shaped spacer 204 interposed therebetween. Meanwhile, a bar-like rod 210 is provided on the opposite side of the second electrode 203 opposite to the dielectric member 201 with an elastic member 205 interposed therebetween.

A first terminal 206 is provided on the first face side of the first electrode 202. The first terminal 206 has a disk-shaped flange portion 206a and a lead portion 206b extending from a substantially central portion of a face of the flange portion 206a. When writing pressure is applied to the flange portion 206a through the rod 210, the flange portion 206a contacts the first face of the first electrode 202 and electrically connects to the first electrode 202.

A second terminal 207 is provided at an end portion of the second electrode 203. Similarly to the first terminal 206, the second terminal 207 has, a disk-shaped flange portion 207a and a lead portion 207b extending from a substantially central portion of one face of the flange portion 207a. When writing pressure is applied through the rod 210, the flange portion 207a is brought into contact with an end portion of the face of the second electrode 203 and electrically connects to the second electrode 203.

In the variable capacitor 200, when no pressure or displacement is applied to the rod 210, that is, in an initial state, a small distance is formed between the second face 201b of the dielectric member 201 and the second electrode 203 by the spacer 204, as seen in FIG. 26A. If pressure is applied to the rod 210, the elastic member 205 and the second electrode 203 are pressed and elastically deformed by the rod 210, as seen in FIG. 26B. By the elastic deformation, the second electrode 203 is brought into contact with the second face 201b of the dielectric member 201. Then, if higher pressure is applied to the second electrode 203 through the rod 210, the contact area between the second electrode 203 and the second face 201b of the dielectric member 201 increases, and the capacitance value between the first and second terminals 206 and 207 also increases. The variation in capacitance value between the first and second terminals 206 and 207 is detected to determine the writing pressure applied to the rod 210.

SUMMARY OF THE INVENTION

The conventional variable capacitor 200 does not have a configuration for surely spacing the second electrode 203 away from the dielectric member 201, because the ring-shaped spacer 204 is merely interposed between the second electrode 203 and the dielectric member 201. Therefore, if the variable capacitor 200 is oriented such that the second electrode 203 is positioned upwardly (i.e., above the dielectric member 201), the second electrode 203 will be deformed due to its own weight. Further, where the variable capacitor 200 is incorporated in a position pointer, if a pointing tip portion of the rod 210 directed upwardly, the rod 210 presses the elastic member 205 and the second electrode 203 by the force of gravity thereof. As a result, even when no writing pressure is applied to the variable capacitor 200, the second electrode 203 and the dielectric member 201 may be placed into contact with each other.

Further, when the second electrode 203 and the dielectric member 201 remain in contact, there is a possibility that the second electrode 203 and the dielectric member 201 may stick to each other. Therefore, the second electrode 203 or the dielectric member 201 may be degraded such that durability of the variable capacitor 200 deteriorates.

Therefore, it is desirable to provide a position pointer, a variable capacitor, and an inputting apparatus, in which an initial state of the variable capacitor can be restored with certainty and improvement in durability can be achieved.

According to an aspect of the present invention, there is provided a position pointer comprising a substantially tubular housing having an opening, a bar-like rod disposed in the housing such that one end thereof projects from the opening, and a variable capacitor having a capacitance value which varies in response to pressure applied thereto through the rod. The capacitor includes a dielectric member having a first face portion opposite a second face portion, a first electrode section disposed on the first face portion of the dielectric member, a conductive member facing the second face portion of the dielectric member and forming a second electrode section when brought into contact with the second face portion of the dielectric member, and an elastic member coupled with the conductive member and adapted for biasing the conductive member away from the second face portion. A contact area between the conductive member and the second face portion forming the second electrode section varies depending on the pressure applied thereto through the rod.

According to another aspect of the present invention, there is provided a variable capacitor including a dielectric member having a first face portion opposite a second face portion, a first electrode section disposed on the first face portion of the dielectric member, a conductive member facing the second face portion of the dielectric member and forming a second electrode section when brought into contact with the second face portion of the dielectric member, and an elastic member coupled with the conductive member and adapted for biasing the conductive member away from the second face portion. A contact area between the conductive member and the second face portion forming the second electrode section varies depending on the pressure applied thereto through the rod.

According to a further aspect of the present invention, there is provided an inputting apparatus comprising a position pointer and a position detection apparatus having a detection face for detecting the position indicated by the end of the rod. The position pointer includes a housing, a substantially bar-like rod disposed in the housing such that an end thereof projects from the housing, and a variable capacitor having a capacitance value which varies in response to pressure applied thereto through the rod. The variable capacitor includes a dielectric member having a first face portion opposite a second face portion, a first electrode section disposed on the first face portion of the dielectric member, a conductive member facing the second face portion of the dielectric member and forming a second electrode section when brought into contact with the second face portion of the dielectric member, and an elastic member coupled with the conductive member and adapted for biasing the conductive member away from the second face portion. A contact area between the conductive member and the second face portion forming the second electrode section varies depending on the pressure applied thereto through the rod.

Since the conductive member is biased by the elastic member in the direction in which it is spaced away from the dielectric member, the conductive member can be returned to its initial state with certainty, and thus the responsiveness upon "powering-down" can be improved. Further, since the conductive member can be prevented or suppressed from sticking to the dielectric member, degradation of the conductive member or the dielectric member can be prevented or suppressed, and durability of the variable capacitor can be improved.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 12A is a sectional view taken along line S-S' of FIG. 11A and FIG. 12B is a sectional view taken along line T-T' of FIG. 11A;

DETAILED DESCRIPTION OF THE PREFERRED EMBODIMENTS

In the following, a position pointer, a variable capacitor and an inputting apparatus of the present invention are described with reference to FIGS. 1 to 25.

[Inputting Apparatus]

Figure 1:
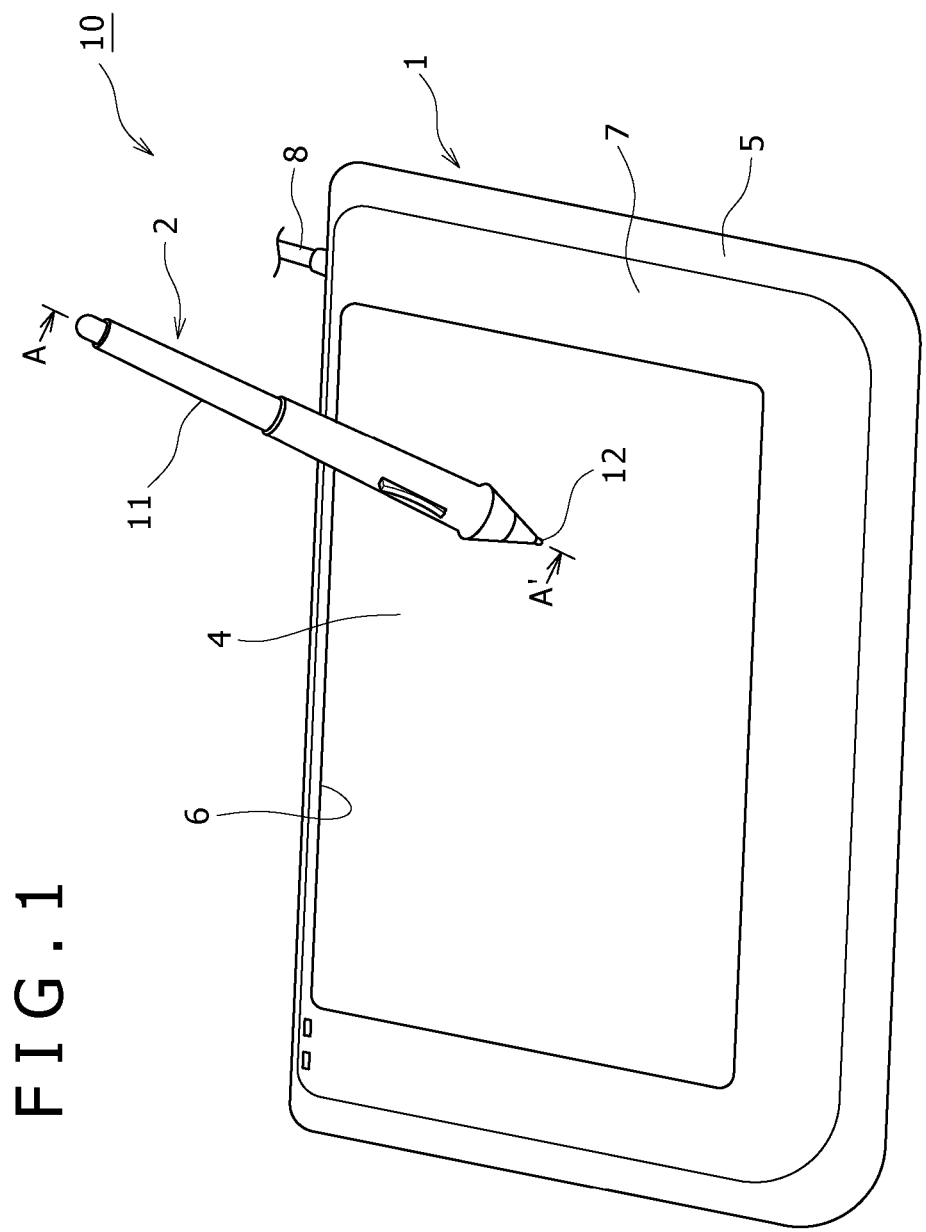
FIG. 1 is a perspective view of an inputting apparatus to which the present invention is applied.

First, a general configuration of an inputting apparatus of the present invention is described with reference to FIG. 1.

The inputting apparatus 10 according to the present embodiment includes a position detection apparatus 1, and a position pointer 2 for inputting information to the position detection apparatus 1.

[Position Detection Apparatus]

The position detection apparatus 1 is connected to an external apparatus such as a personal computer or a Personal Digital Assistant PDA (not shown) by a cable 8 so that it is used as an inputting apparatus for the external apparatus. The position detection apparatus 1 may also be built in a personal computer or the like.

The position detection apparatus 1 includes a detection section 4 for detecting the position indicated by the position pointer 2 and a housing 5 having a shape of a substantially hollow thin parallelepiped. The housing 5 includes an upper housing 7 having an opening 6 for exposing a detection face of the detection section 4 therethrough, and a lower housing (not shown) for mating with the upper housing 7. The opening 6 of the upper housing 7 has a quadrangular shape and allows an inputting face of the detection section 4 to be exposed therethrough. The detection section 4 is fitted in the opening 6. The position detection apparatus 1 with a configuration described above is used to input characters, figures, and so forth by a pointing operation using the position pointer 2.

[Position Pointer]

Figure 2:
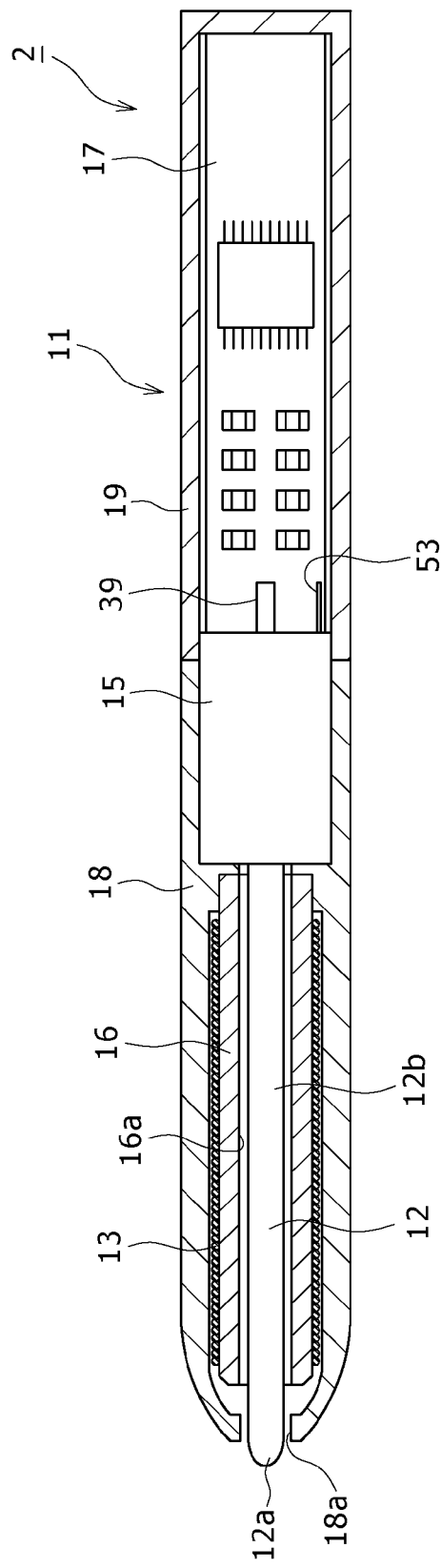
FIG. 2 is a sectional view taken along line A-A' of FIG. 1 illustrating a position pointer shown in FIG. 1.

Now, a general configuration of the position pointer 2 is described with reference to FIG. 2. FIG. 2 is a sectional view taken along line A-A' of the position pointer 2 shown in FIG. 1.

The position pointer 2 points to a position on the position detection apparatus 1 in accordance with an electromagnetic induction method. The position pointer 2 includes a resonance circuit which resonates with an electromagnetic wave of a predetermined frequency transmitted thereto from the position detection apparatus 1. The position pointer 2 transmits the resonance signal detected by the resonance circuit to the position detection apparatus 1 to indicate its position to the position detection apparatus 1.

The position pointer 2 includes a housing (for example, a case) 11, a rod 12, a position indicating coil 13, a variable capacitor 15, a ferrite core 16, and a printed board 17.

The case 11 is a sheath section of the position pointer 2. The case 11 has a bottomed cylindrical shape closed at one end thereof. The case 11 includes a first case 18 and a second case 19 superposed in an axial direction and coupled to each other. The first case 18 has a substantially conical shape at a first end thereof in the axial direction, and has an opening 18a at its tip. The first case 18 is open at a second end thereof in the axial direction.

The second case 19 has a cylindrical shape which is open at a first end thereof in the axial direction and is closed at a second end thereof. The first case 18 and the second case 19 are disposed on the same axial line. The second end of the first case 18 and the first end of the second case 19 are secured to each other by fixing means, such as a bonding agent or a fastening screw. The printed board 17 having electronic parts mounted thereon is secured inside the second case 19 by fixing means, such as a fastening screw. The ferrite core 16 is accommodated in the first case 18.

The ferrite core 16 has, for example, a cylindrical shape and has a tubular hole 16a in which the rod 12 is fitted. Further, the position indicating coil 13, which forms the resonance circuit, is wound on an outer periphery of the ferrite core 16. The opposite ends (not shown) of the position indicating coil 13 are electrically connected to the electronic parts on the printed board 17. Electronic parts which form the resonance circuit are mounted on the printed board 17.

The rod 12 is formed from a bar-like member. The rod 12 includes a pointing tip portion 12a provided at an end thereof in its axial direction and acting as a pen point, and a stem portion 12b formed continuously from the pointing tip portion 12a. The pointing tip portion 12a is formed in a substantially conical shape. The rod 12 is fitted in the ferrite core 16 and accommodated in the case 11. The pointing tip portion 12a of the rod 12 projects outwardly from the opening 18a of the first case 18. The variable capacitor 15 is attached to the other end of the rod 12 in the axial direction.

[Variable Capacitor]

Now, the variable capacitor 15 of the present invention is described with reference to FIGS. 3 to 18B.

The variable capacitor 15 has a capacitance value which varies in response to the pressure applied to the variable capacitor 15. Writing pressure applied to the rod 12 is transferred to the variable capacitor 15, and the variable capacitor 15 functions as a writing pressure detection section of the position pointer 2.

Figure 3:
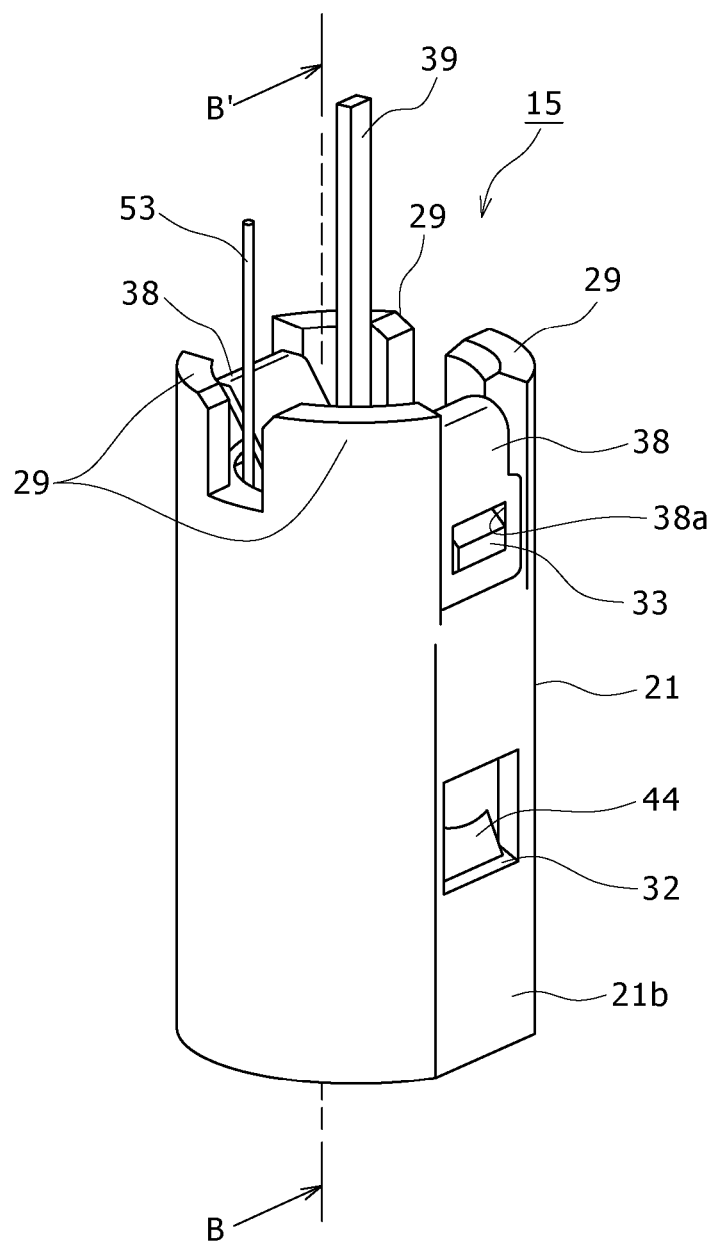
FIG. 3 is a perspective view of a variable capacitor to which the present invention is applied.
Figure 4:
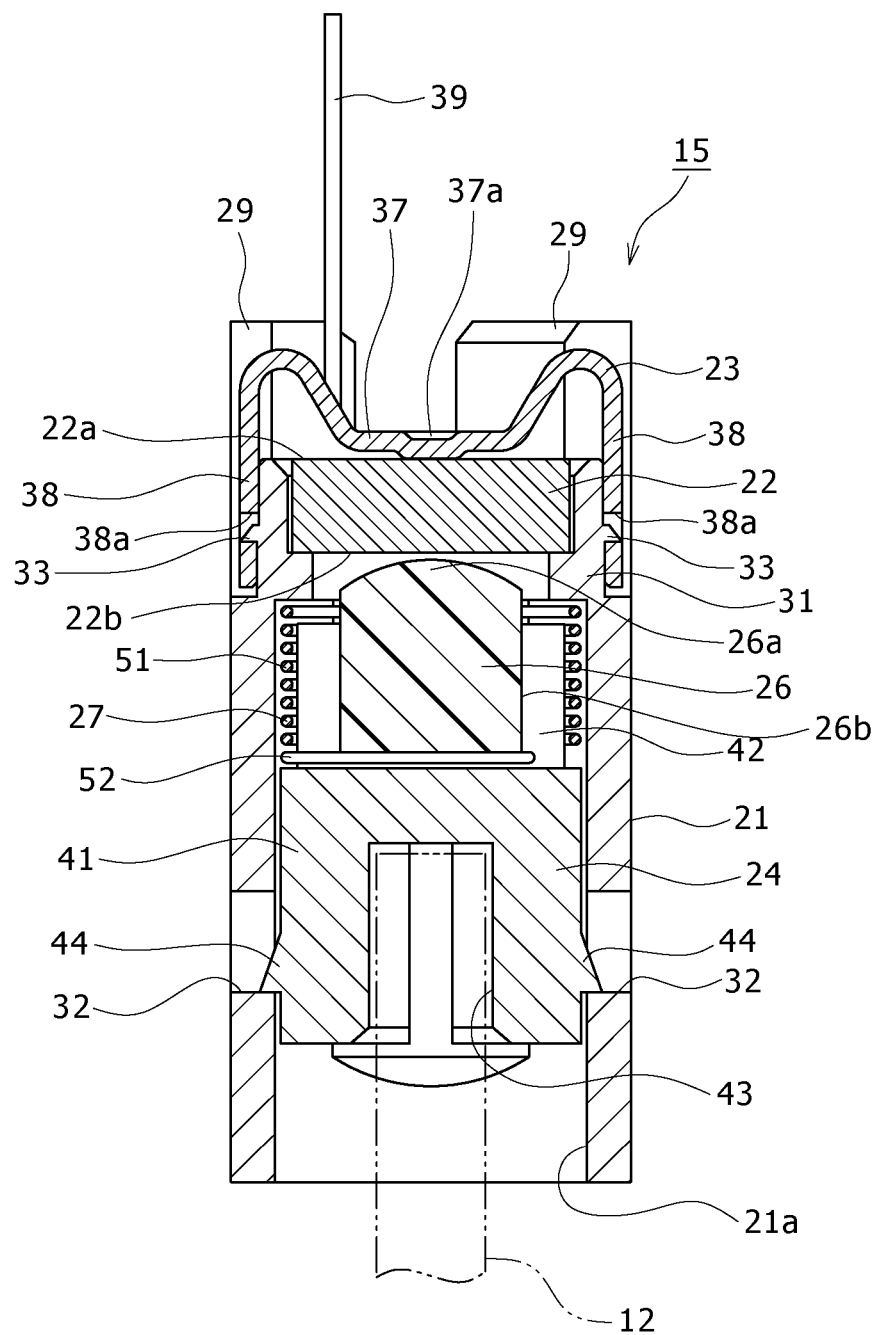
FIG. 4 is a sectional view taken along line B-B' of FIG. 3 showing the variable capacitor of FIG. 3.

Referring to FIGS. 3 and 4, the variable capacitor 15 includes a holder 21, a dielectric member 22, a terminal member 23 for biasing the dielectric member 22, a holding member 24, a conductive member 26, and an elastic member 27.

[Case]

The holder 21 of the variable capacitor 15 is described with reference to FIGS. 5 to 7B.

The holder 21 is formed in a hollow substantially cylindrical shape with two flat surfaces on opposite sides thereof, forming two flat face portions 21b parallel to each other and on opposite sides of the holder 21. Four projections 29 are formed on a first end side of the holder 21 in the axial direction by cutting away the first end side at four places. As shown in FIG. 4, the dielectric member 22 is attached to the holder 21, and the conductive member 26, elastic member 27 and holding member 24 are accommodated in a tubular hole 21a of the holder 21, which is a particular example of a hollow portion. The holder 21 has a flange portion 31, two engaging holes 32 and two locking receiving portions 33 provided thereon.

Figure 6A:
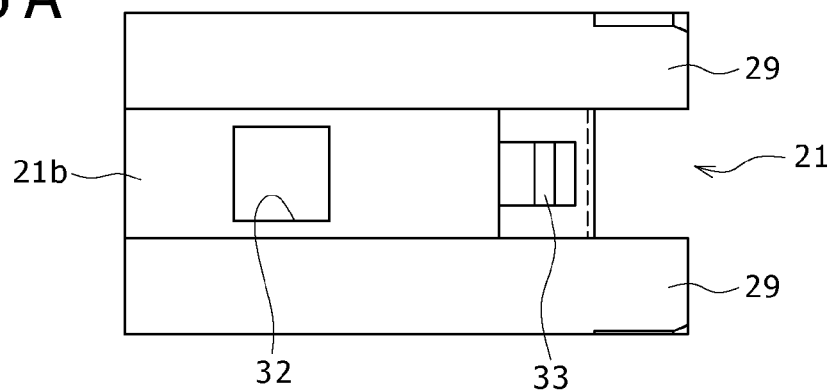
FIG. 6A is a front elevational view showing the case of the variable capacitor of FIG. 5.
Figure 6B:
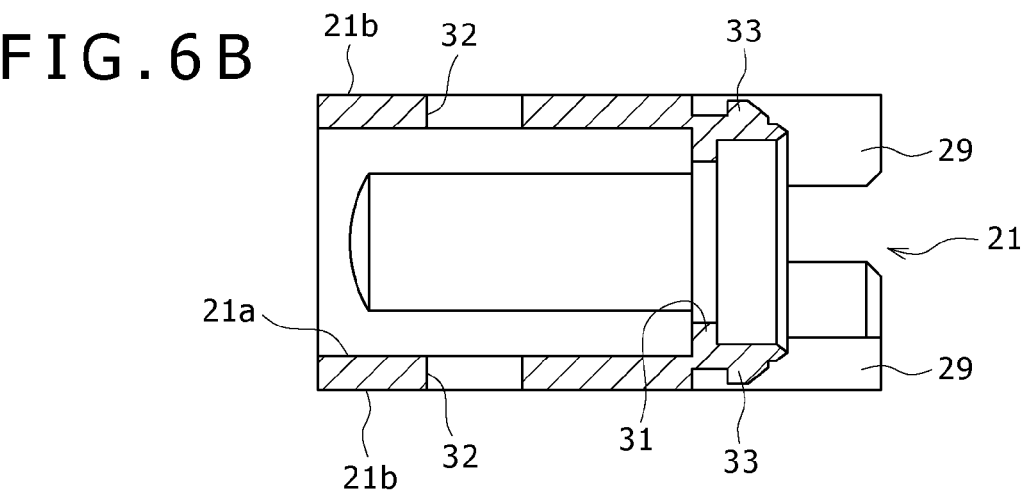
FIG. 6B is a sectional view taken along line C-C' of FIG. 5.
Figure 6C:
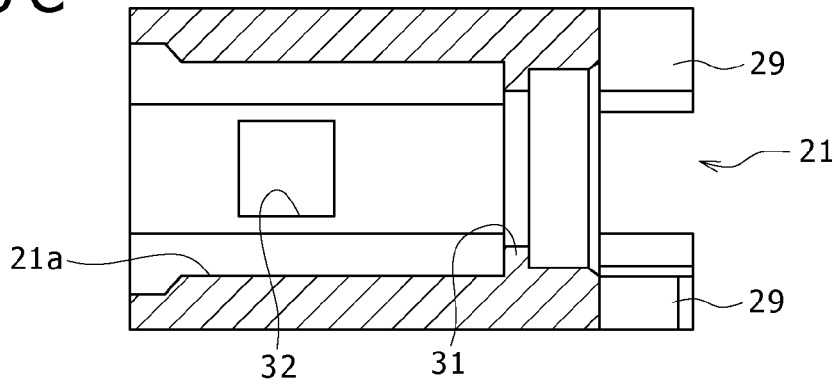
FIG. 6C is a sectional view taken along line D-D' of FIG. 5.
Figure 7A:
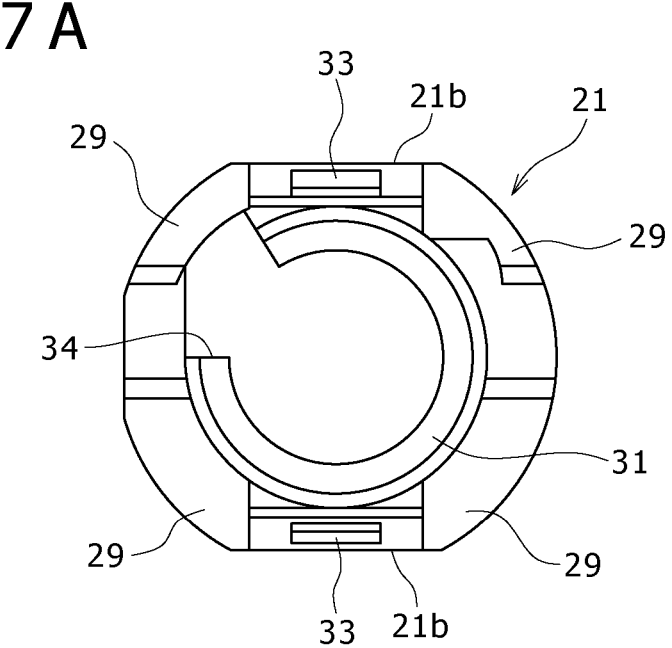
FIGS. 7A and 7B are a top plan view and a bottom plan view showing the case of FIG. 5, respectively.
Figure 7B:
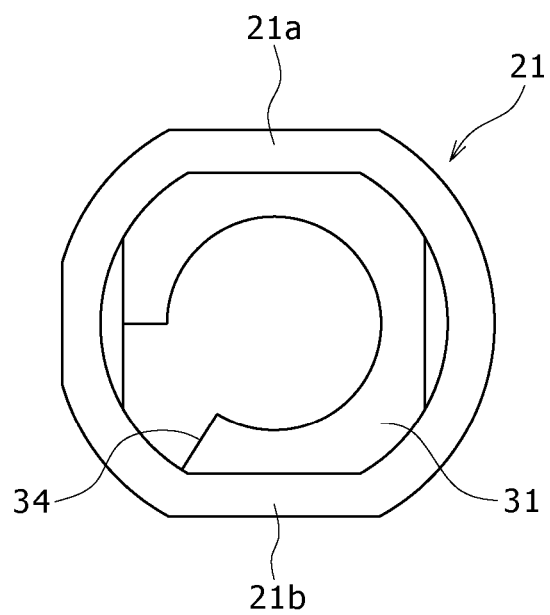

Referring to FIGS. 6B and 6C, the flange portion 31, which is a particular example of a projection, is disposed in such a manner as to project to the inner side of the holder 21 in a radial direction. The flange portion 31 is a collar-like projection formed, for example, on an inner wall of the holder 21 and extending continuously along a circumferential direction of the inner wall. Referring to FIG. 4, the dielectric member 22 contacts the flange portion 31 from the first end side of the holder 21 in the axial direction, and the elastic member 27 contacts the flange portion 31 from a second end side of the holder 21 in the axial direction. As shown in FIGS. 7A and 7B, a through-hole 34 is provided by cutting away a part of the flange portion 31.

In the described embodiment, the collar-like flange portion provided on the inner wall of the holder 21 and projecting continuously along the circumferential direction of the inner wall is a particular example of the projection. However, the projection may be also formed as a plurality of protrusions projecting to the inner side of the inner wall in a radial direction on the inner wall of the holder 21. In principle, the projection may be formed in any shape as long as the dielectric member 22 contacts the projection from the first end side of the holder 21 in the axial direction and the elastic member 27 contacts the projection from the second end side of the holder 21 in the axial direction.

Figure 5:
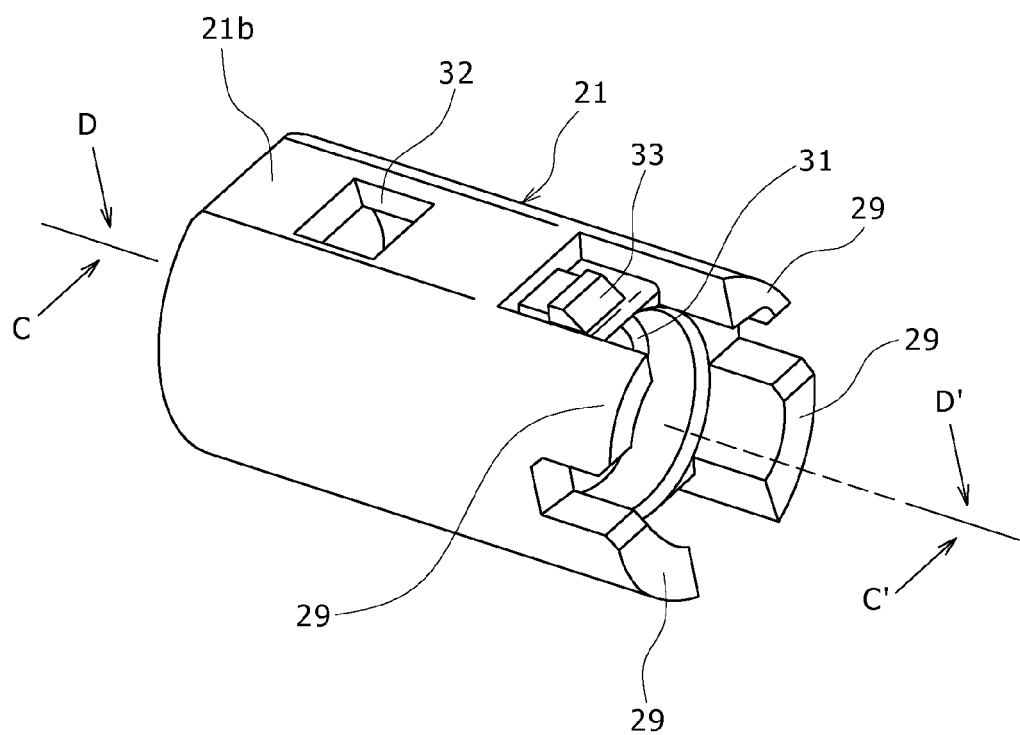
FIG. 5 is a perspective view showing a case of the variable capacitor of FIG. 3.

Referring to FIGS. 5, 6A and 6B, the two engaging holes 32, which represent a particular example of a first engaging portion, are provided on the two flat face portions 21b of the holder 21. The two engaging holes 32 are provided at a location of the holder 21 displaced to the second end side from the center in the axial direction. Further, the engaging holes 32 may comprise, for example, a substantially quadrangular shape. As shown in FIGS. 3 and 4, the holding member 24 is engaged with the engaging holes 32 along the axial direction of the holder 21. The shape of the engaging holes 32 do not have to have a substantially quadrangular shape, but may have a substantially circular shape. Further, the engaging holes 32 may be formed as recessed portions provided on the inner wall of the holder 21.

Further, as shown in FIGS. 5, 6A and 6B, the two locking receiving portions 33 are provided on the first end side of the holder 21 in the axial direction. The locking receiving portions 33 are provided on the first end side of the holder 21 in the axial direction such that they are positioned between two projections 29 (refer to FIG. 6A). As shown in FIG. 6B, the locking receiving portions 33 have a cross section of a substantially trapezoidal shape taken along the axial direction of the holder 21. The terminal member 23 is secured to the holder 21 by the two locking receiving portions 33 as seen in FIGS. 3 and 4.

Engineering plastic or the like may be used as a material of the holder 21. While in the embodiment described above the holder 21 is formed in a cylindrical form, the holder 21 may take, for example, an angular tubular shape. In the embodiment described above the dielectric member 22, conductive member 26, elastic member 27 and holding member 24 are accommodated in the holder 21. However, the holder 21 and the case 11 may be molded as a unitary member while the conductive member 26, elastic member 27 and holding member 24 may be housed directly in the case 11.

[Dielectric Member]

Figure 8A:
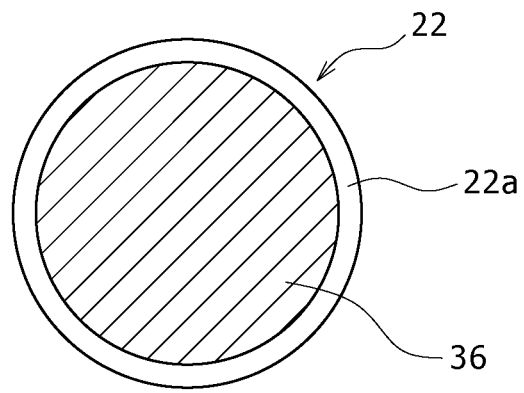
FIGS. 8A, 8B and 8C are a top plan view, a front elevational view and a bottom plan view showing a dielectric member of the variable capacitor of FIG. 3, respectively.
Figure 8B:
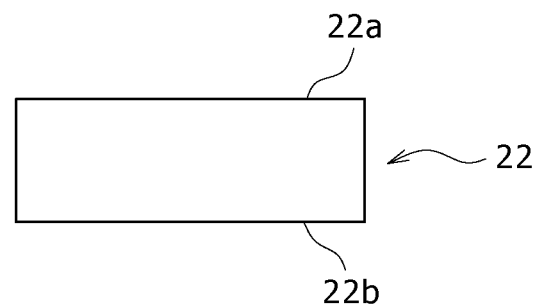
Figure 8C:
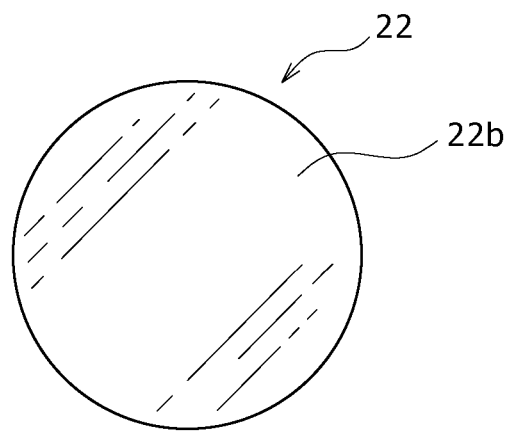

Now, the dielectric member 22 is described with reference to FIGS. 8A to 8C. The dielectric member 22 is formed, for example, in a substantially disk shape. The dielectric member 22 has a first face portion 22a of a substantially circular shape, and a second face portion 22b of a substantially circular shape extending substantially in parallel, and opposing to, the first face portion 22a. A first electrode portion 36 is provided substantially over an overall area of the first face portion 22a. The first electrode portion 36 is formed, for example, by sintering a silver plate on the first face portion 22a. Further, as seen in FIG. 8C, the second face portion 22b is formed as a mirror face by polishing the surface thereof.

As shown in FIG. 4, the dielectric member 22 is placed on the flange portion 31 with the second face portion 22b thereof directed to the second end side of the holder 21 in the axial direction. Further, the dielectric member 22 is biased toward the second end side of the holder 21 in the axial direction by the terminal member 23, which is placed on the flange portion 31 of the holder 21. The shape of the dielectric member 22 does not have to be a substantially disk shape. The dielectric member 22 may also be formed as a flat plate of a substantially quadrangular shape or a hexagonal shape. Further, while in the embodiment described above, the second face portion 22b is formed as a mirror face by polishing, the second face portion 22b may also be formed by other methods.

[Terminal Member]

Figure 9:
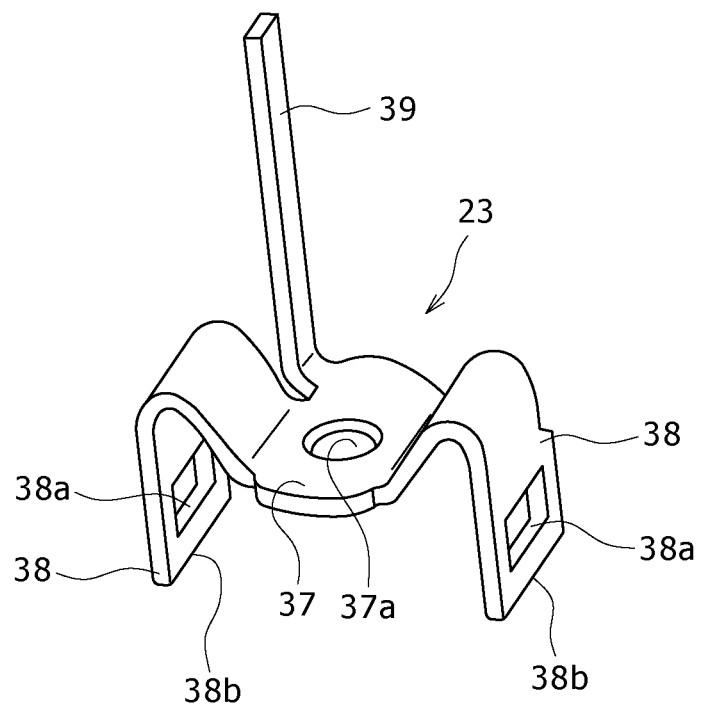
FIG. 9 is a perspective view showing a terminal member of the variable capacitor of FIG. 3.

FIG. 9 is a perspective view showing the terminal member 23. Referring to FIG. 9, the terminal member 23 has a flat portion 37, which is an example of a contact portion, two locking portions 38 formed continuously from the flat portion 37, and a lead piece 39. The flat portion 37 is formed substantially as a flat plate and has a protrusion 37a provided at a substantially central portion thereof. The two locking portions 38 are a particular example of a second engaging portion.

The two locking portions 38 are formed in a substantially L shape in such a manner as to hold the flat portion 37 therebetween. The locking portions 38 are provided with elasticity by bending the flat portion 37 twice from outer edges of the flat portion 37. An opening 38a of a substantially quadrangular shape, for example, is provided at an end portion 38b of the locking portions 38.

The lead piece 39 projects in a direction opposite to the direction in which the end portions 38b of the locking portions 38 project. The lead piece 39 is connected to a contact portion (not shown) of the printed board 17 shown in FIG. 2, for example, by resistance welding, ultrasonic welding or the like. By such resistance welding or ultrasonic welding, the terminal member 23 is electrically connected to electronic parts on the printed board 17. Copper-titanium alloy plated with silver or the like may be used as a material for the terminal member 23.

As shown in FIGS. 3 and 4, the terminal member 23 is secured to the holder 21 by the locking receiving portions 33 of the holder 21, which lock the openings 38a of the two locking portions 38. When the terminal member 23 is secured to the holder 21, the flat portion 37 of the terminal member 23 contacts the first electrode portion 36 provided on the first face portion 22a of the dielectric member 22. Since the locking portions 38 are elastic, the dielectric member 22 is biased toward the second end side of the holder 21 in the axial direction by the terminal member 23. Consequently, the flat portion 37 and the first electrode portion 36 can contact each other with certainty and the contact failure between the dielectric member 22 and the terminal member 23 can be prevented or suppressed. Further, the dielectric member 22 can be prevented or suppressed from being tilted (inclined) in the holder 21.

Further, since the protrusion 37a is provided on the flat portion 37 of the terminal member 23, the flat portion 37 and the dielectric member 22 contact each other by a point-contact. Consequently, the first electrode portion 36, provided on the first face portion 22a of the dielectric member 22, and the terminal member 23 can contact each other with certainty without being influenced by warping or floating of the terminal member 23 which occurs upon presswork of the terminal member 23.

As described above, the terminal member 23 has two roles, including a role of biasing the dielectric member 22 toward the second end side of the holder 21 side and another role as an electrode terminal to be connected to the printed board 17. While in the embodiment described above the terminal member 23 is formed as a single member, the flat portion 37 and locking portion 38 and the lead piece 39 may be formed as separate members.

Now, the holding member 24, conductive member 26 and elastic member 27 are described with reference to FIGS. 10 to 17.

[Holding Member]

Figure 10:
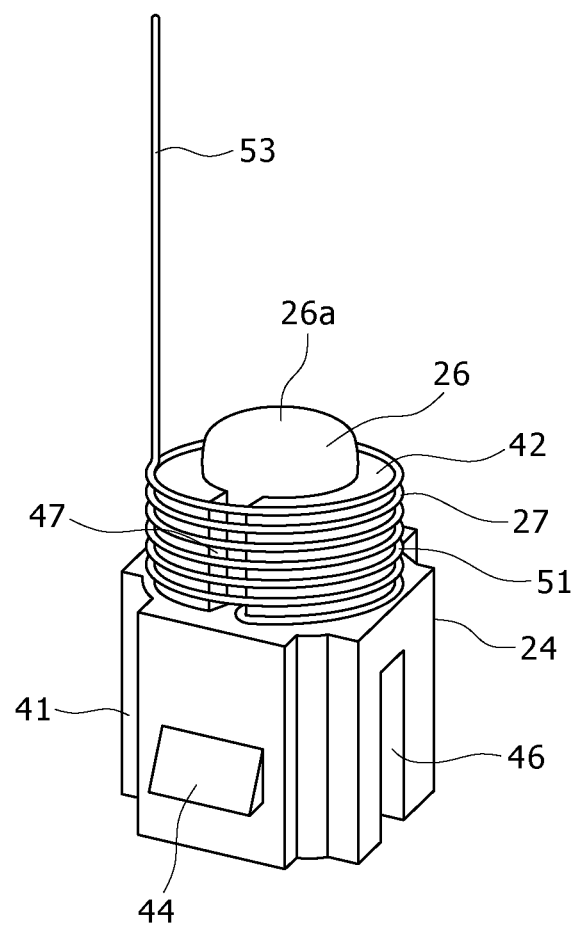
FIG. 10 is a perspective view showing a conductive member and the dielectric member of the variable capacitor of FIG. 3 attached to a holding member.
Figure 11A:
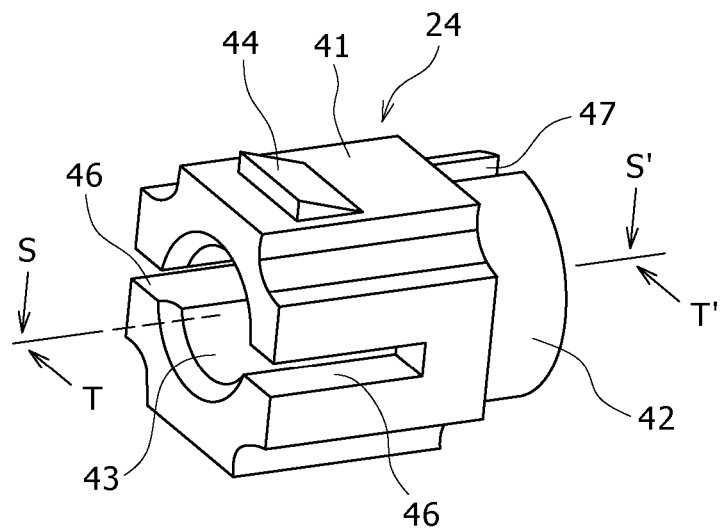
FIGS. 11A and 11B are perspective views of the holding member shown in FIG. 10 as viewed from the opposite sides.
Figure 11B:
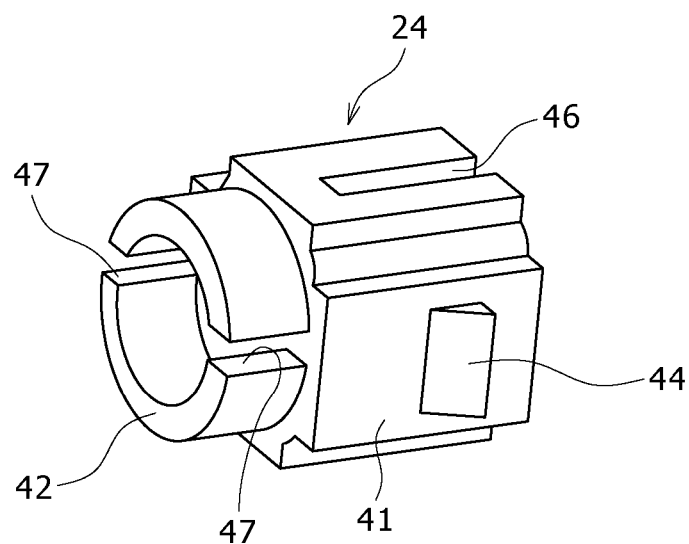
Figure 12A:
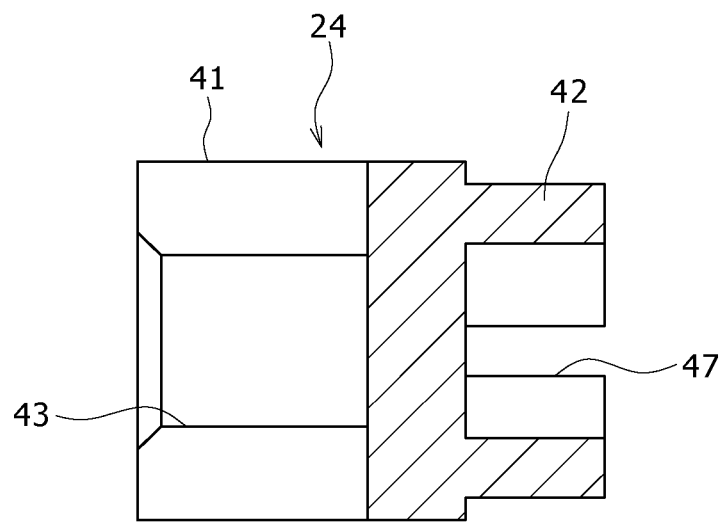
FIGS. 12A and 12B show the holding member shown in FIG. 10 and particularly
Figure 12B:
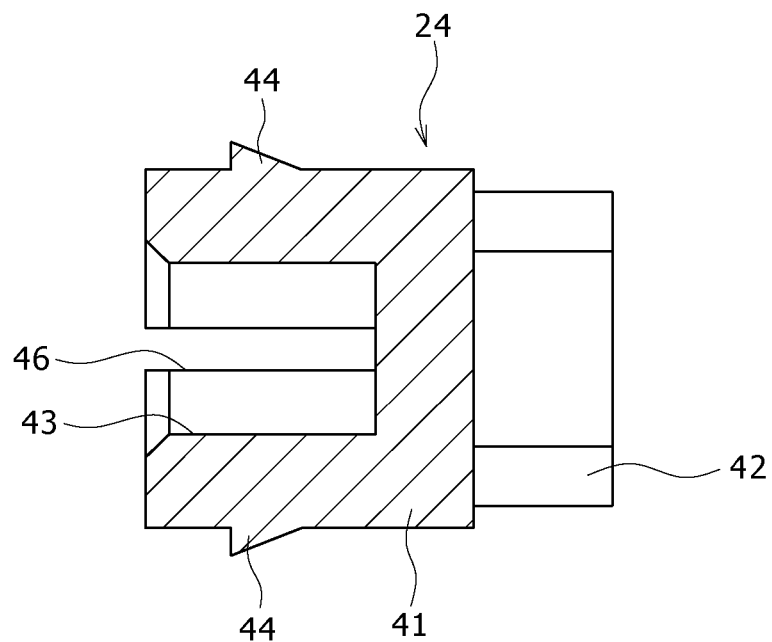
Figure 13:
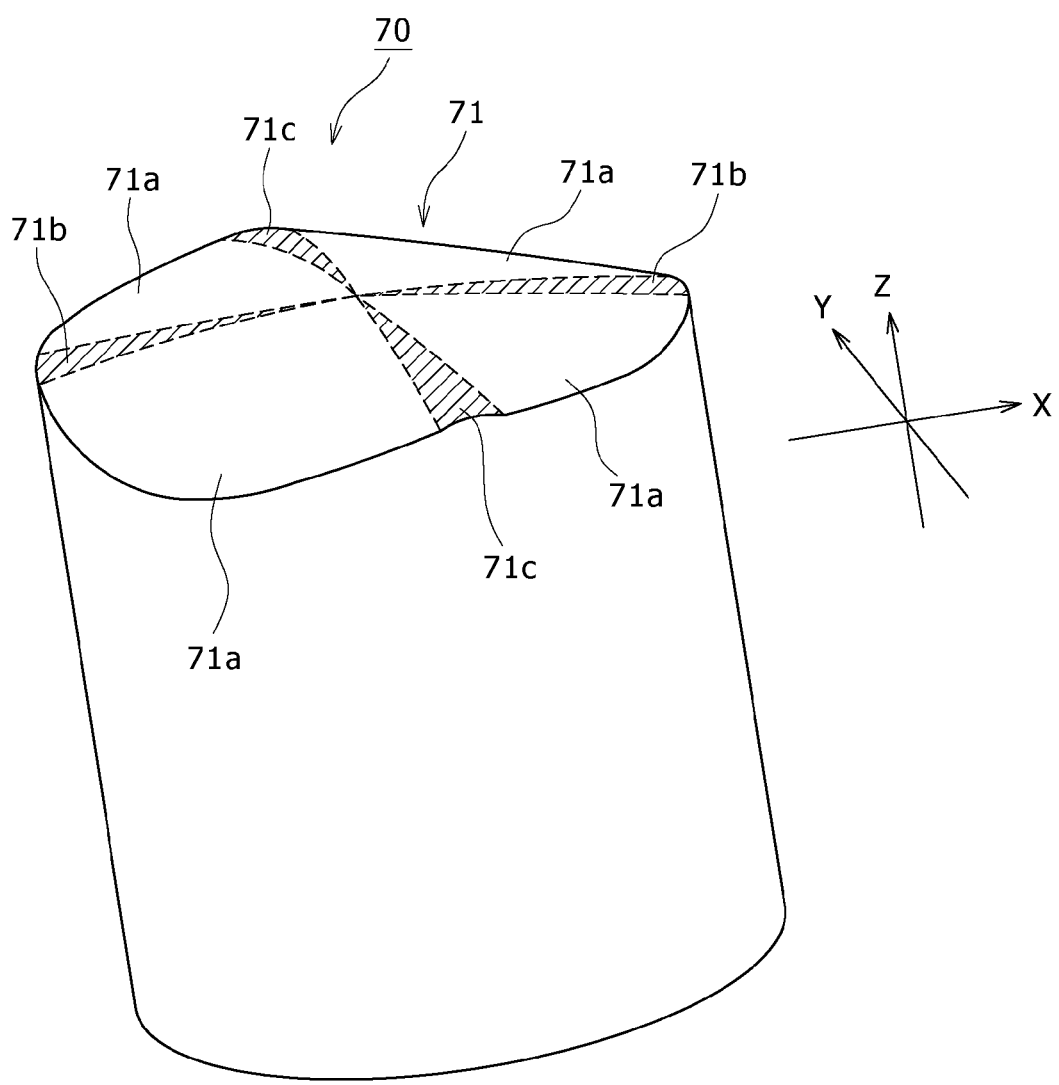
FIG. 13 is a perspective view showing another form of the conductor member of the variable capacitor of FIG. 3.
Figure 14A:
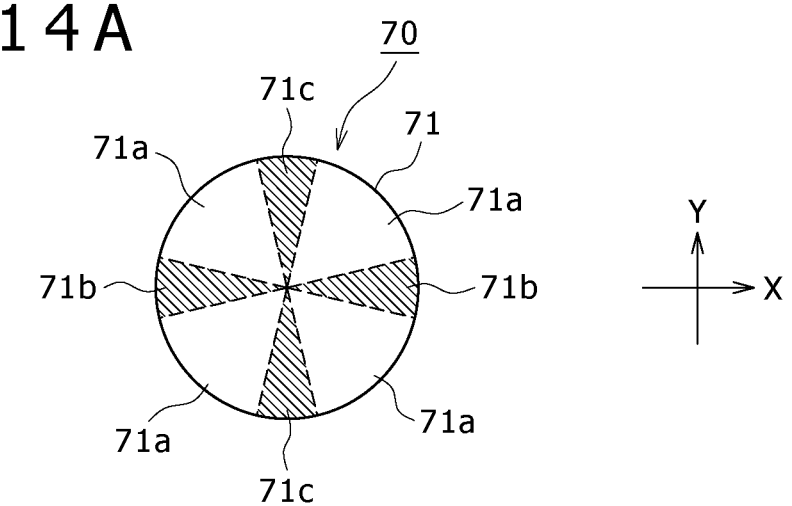
FIGS. 14A, 14B and 14C are a top plan view, a front elevational view and a left side elevational view showing the conductor member of FIG. 13, respectively.
Figure 14B:
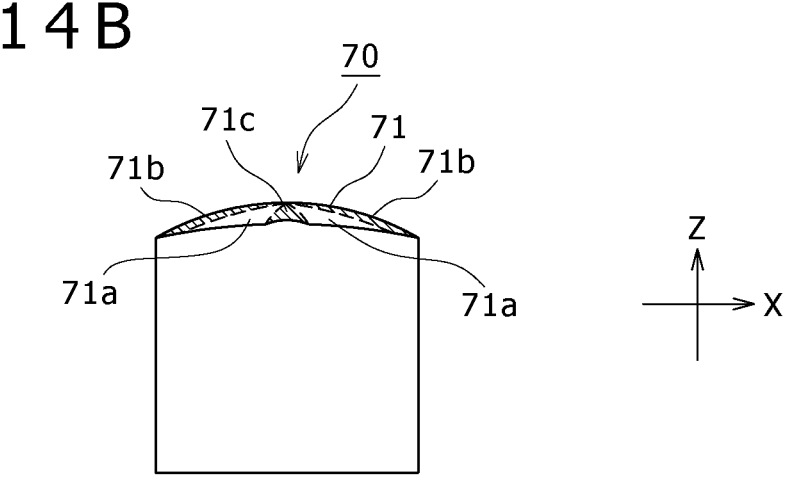
Figure 14C:
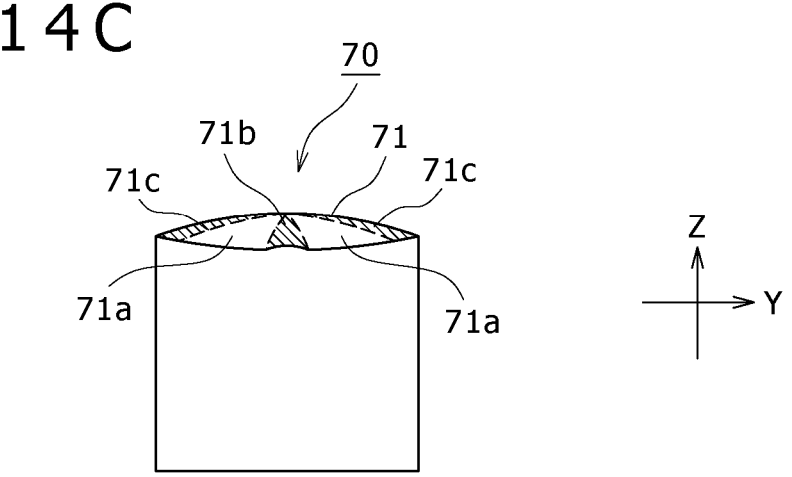

Referring to FIGS. 10 to 12, the holding member 24 has a base portion 41 in the form of a substantially square prism, and a substantially cylindrical fitting portion 42. An engaging recessed portion 43 (refer to FIG. 11) is provided on the base portion 41 such that it is concave in a substantially cylindrical shape. As shown in FIG. 4, the end of the stem portion 12b of the rod 12 is inserted in the engaging recessed portion 43 so that the holding member 24 and the rod 12 are joined together. Further, two engaging portions 44 having a cross section of a substantially triangular shape are provided on the two opposing flat face portions of the side face portions of the base portion 41. The two engaging portions 44 are engaged with the two engaging holes 32 provided on the holder 21. Consequently, the holding member 24 is supported for movement along the axial direction of the holder 21.

Two slits 46 are provided on the base portion 41. The two slits 46 are formed by cutting away the base portion 41 over a predetermined length from one end to the other end side of the base portion 41 in the axial direction.

The fitting portion 42, which is a particular example of a recessed portion, projects to the other end side of the base portion 41. Two cutaway portions 47 are formed at the fitting portion 42 at substantially equal angular distances. The cutaway portions 47 are formed by cutting away the fitting portion 42 from one end of the fitting portion 42 in the axial direction to the base portion 41. The number of such cutaway portions 47 is not limited to two, but may be three or more. Even one cutaway portion 47 will provide the required functionality. The conductive member 26 is fitted in the fitting portion 42.

[Conductive Member]

Referring to FIGS. 4 and 10, the conductive member 26 is formed, for example, in the shape of a cannonball and has a curved face portion 26a at one end thereof in the axial direction. The conductive member 26 is fitted at a cylindrical portion 26b on the other end side thereof in the axial direction with the fitting portion 42 of the holding member 24. The diameter of the cylindrical portion 26b of the conductive member 26 may be set, for example, a little greater than the inner diameter of the fitting portion 42 of the holding member 24. Consequently, the conductive member 26 and the fitting portion 42 of the holding member 24 may fit tightly together. As a result, the conductive member 26 can be prevented or suppressed from coming off from the fitting portion 42 of the holding member 24.

The conductive member 26 may be formed from a conductive and elastically deformable material. Silicon conductive rubber or pressure sensitive conductor rubber (PCR) can be used, for example. When a conductive and elastically deformable member is used, the contact area between the second face portion 22b of the dielectric member 22 and the conductive member 26 increases as the pressure applied to the rod 12 increases.

In the embodiment described above, the conductive member 26 is shaped such that the curved face portion 26a, which is one of end portions of the conductive member 26, is formed as a substantially semispherical shape. However, the conductive member is not limited to this specific shape. The conductive member 26 may be formed in any shape as long as the area thereof which opposes the first electrode portion 36 increases as the pressure applied to the rod 12 increases.

Now, another form of the conductive member is described with reference to FIGS. 13 and 14A to 14C.

The conductive member 70 is formed in a substantially cylindrical shape and has, at one end thereof in its axial direction, a curved face portion 71 having three different radii of curvature. The curved face portion 71 has a first curved face 71a having a first radius Ra of curvature in a first direction X perpendicular to an axial direction Z of the conductive member 70. The first curved face 71a has a second radius Rb of curvature different from the first radius Ra of curvature in a second direction Y which is perpendicular to the axial direction Z of the conductive member 70 and also to the first direction X.

Further, the curved face portion 71 has second curved faces 71b formed along the first direction X passing across the axis of the conductive member 70, and having the first radius Ra of curvature in the first direction X, and a third radius Rc of curvature, which is different from the first radius Ra of curvature and the second radius Rb of curvature, in the second direction Y. Further, the curved face portion 71 has third curved faces 71c formed along the second direction Y passing across the axis of the conductive member 70, and having the second radius Rb of curvature in the second direction Y and the third radius Rc of curvature in the first direction X. In other words, the second curved faces 71b are formed on an edge formed by the curved faces having the first radius Ra of curvature. The third curved faces 71c are formed on an edge formed from the curved faces having the second radius Rb of curvature.

The first radius Ra of curvature is set, for example, to 2 mm, and the second radius Rb of curvature is set, for example, to 4 mm. Further, the third radius Rc of curvature is set, for example, to 0.5 mm.

There is the possibility that the conductive member 26 formed in a substantially cannonball shape described above may not contact the second face portion 22b of the dielectric member 22 at the top portion of the curved face portion 26a due to variation among products or displacement introduced during assembly. However, with the conductive member 70 described above, even if variation among products or displacement between the holding member 24 and the conductive member 70 may occur during assembly, the second curved face 71b or the third curved face 71c will contact the second face portion 22b of the dielectric member 22, by point-contact, with certainty.

While one end of the conductive member 70 in the axial direction is formed such that the first radius Ra of curvature and the second radius Rb of curvature intersect by approximately 90°, the radii of curvature are not restricted to the specific examples. For example, the first radius Ra of curvature and the second radius Rb of curvature may be formed from two different angular directions and an edge formed by the curved faces having the first radius Ra of curvature and an edge formed by the curved faces having the second radius Rb of curvature are chamfered so as to be rounded. By this measure also, even if variation among products or displacement between the holding member 24 and the conductive member 70 may occur during assembly, the second curved face or the third curved face will contact the second face portion 22b of the dielectric member 22, by point-contact, with certainty.

[Elastic Member]

Figure 15A:
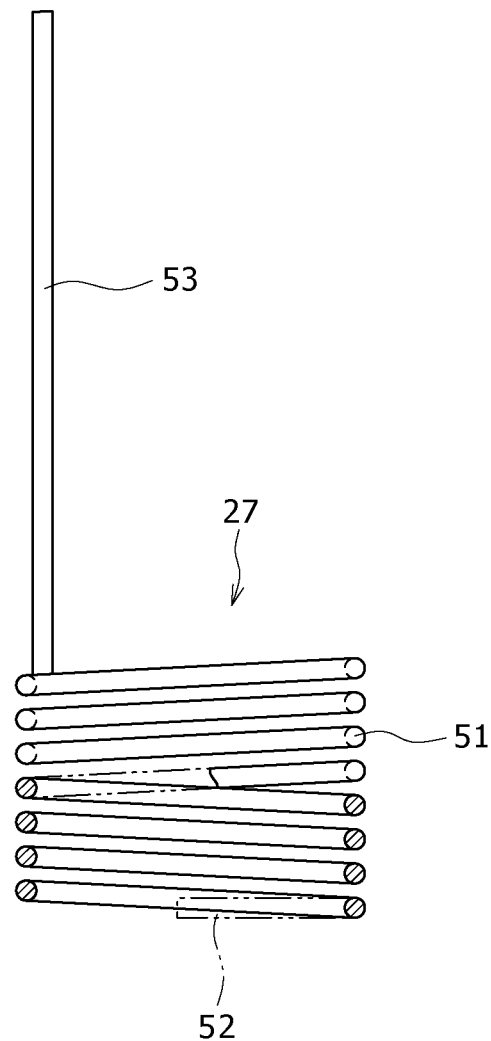
FIGS. 15A and 15B are a front elevational view and a top plan view of an elastic member of the variable capacitor of FIG. 3, respectively.
Figure 15B:
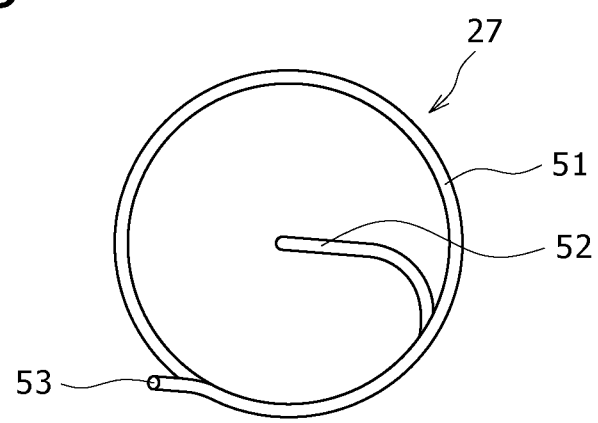

Referring to FIGS. 15A and 15B, the elastic member 27 is, for example, a conductive coil spring that has an elastic coiled portion 51, a terminal piece 53 provided at one end portion of the coiled portion 51, and a connecting portion 52 provided at the other end of the coiled portion 51.

The connecting portion 52, which is a particular example of a second terminal section, is formed by bending the other end portion of the coiled portion 51 substantially perpendicularly toward the inner side of the coiled portion 51 in a radial direction. The connecting portion 52 is engaged with a cutaway portion 47 provided at the fitting portion 42 of the holding member 24 to attach the elastic member 27 to the holding member 24. As shown in FIGS. 4 and 10, the elastic member 27 is disposed such that, when it is attached to the holding member 24, the coiled portion 51 thereof covers an outer periphery of the conductive member 26 with the fitting portion 42 of the holding member 24 interposed therebetween. In this instance, the connecting portion 52 is interposed between the holding member 24 and the conductive member 26 and contacts the conductive member 26. Consequently, the elastic member 27 is electrically connected to the conductive member 26.

Meanwhile, the terminal piece 53, which is a particular example of a first terminal section, is formed by bending one end portion of the coiled portion 51 substantially perpendicularly with respect to the winding direction. As shown in FIG.

3, when the elastic member 27 is disposed in the holder 21, the terminal piece 53 fits in the through-hole 34 provided in the holder 21 and projects to the first end side of the holder 21 in the axial direction. The terminal piece 53 is connected to a contact portion (not shown) of the printed board 17 as seen in FIG. 2, for example, by soldering, resistance welding or ultrasonic welding. The elastic member 27 is thus electrically connected to an electronic part of the printed board 17. Any conductive material may be used to form the elastic member 27, for example, a metal material such as copper-titanium alloy or stainless steel.

As shown in FIG. 4, the conductive member 26 and the elastic member 27 are attached to the holding member 24 and disposed in the tubular hole 21a of the holder 21. In this instance, the curved face portion 26a formed on the one end side of the conductive member 26 in the axial direction is opposed to the second face portion 22b of the dielectric member 22 and forms a second electrode section.

Figure 16:
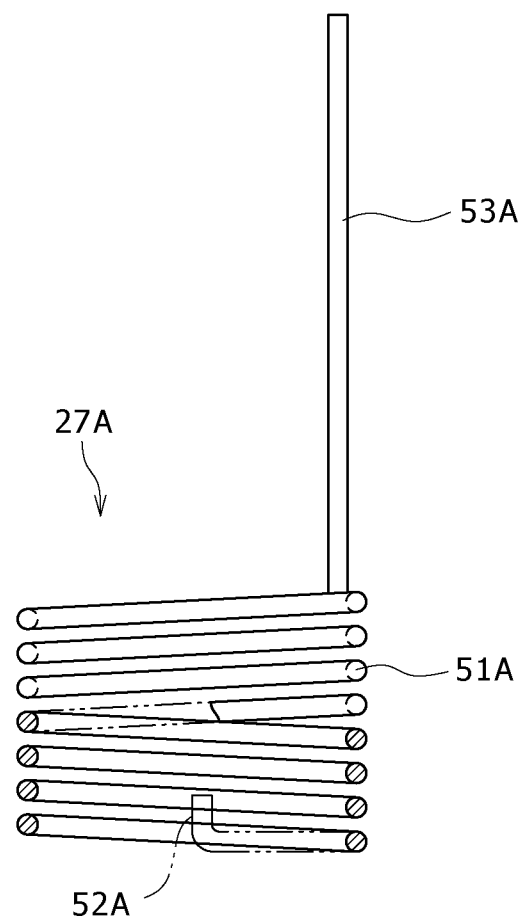
FIG. 16 is a front elevational view showing another form of the elastic member of the variable capacitor of FIG. 3.

The elastic member 27A shown in FIG. 16 is formed by further bending the connecting portion 52A in the winding direction of the coiled portion 51. Consequently, when the elastic member 27A and the conductive member 26 are attached to the holding member 24, the connecting portion 52A penetrates the other end of the conductive member 26 in the axial direction. As a result, the conductive member 26 and the elastic member 27A can be connected with certainty, and contact failure between the conductive member 26 and the elastic member 27A can be prevented or suppressed.

[Assembly of the Variable Capacitor]

The variable capacitor 15 having a configuration described above is assembled, for example, in the following manner. First, the conductive member 26 and the elastic member 27 are attached to the holding member 24. In particular, the connecting portion 52 of the elastic member 27 is mounted on the holding member 24 when it is engaged with the cutaway portion 47 provided on the fitting portion 42 of the holding member 24. At this time, the coiled portion 51 of the elastic member 27 is disposed such that it covers the outer periphery of the fitting portion 42 of the holding member 24. Here, since the two cutaway portions 47 are provided on the fitting portion 42, when the elastic member 27 is attached to the holding member 24, there is no necessity to consider the directions of the connecting portion 52 of the elastic member 27 and the cutaway portion 47 of the holding member 24, in comparison with an alternative case where a single cutaway portion 47 is provided. Therefore, the elastic member 27 can be efficiently attached.

Then, the conductive member 26 is fitted into the fitting portion 42 of the holding member 24. Here, since the fitting between the fitting portion 42 and the conductive member 26 is tight, it is possible to prevent or suppress the conductive member 26 from coming out from the holding member 24.

When the conductive member 26 is fitted into the fitting portion 42 of the holding member 24, the connecting portion 52 of the elastic member 27 is interposed between the conductive member 26 and the holding member 24 and contacts the conductive member 26. Consequently, the conductive member 26 and the elastic member 27 are electrically connected. Further, the elastic member 27 is disposed such that the coiled portion 51 thereof covers the outer periphery of the conductive member 26 with the fitting portion 42 of the holding member 24 interposed therebetween. Consequently, a first assembly including the conductive member 26, elastic member 27 and holding member 24 is assembled.

Then, as shown in FIG. 4, the dielectric member 22 is inserted into the holder 21 from the first end side of the holder 21 in the axial direction with the second face portion 22b thereof directed toward the second end side of the holder 21, and is placed on the flange portion 31 of the holder 21. After that, the terminal member 23 is attached to the holder 21. In particular, the two locking portions 38 of the terminal member 23 are locked to the two locking receiving portions 33 of the holder 21. When the two locking portions 38 of the terminal member 23 are locked to the two locking receiving portions 33 of the holder 21, the flat portion 37 of the terminal member 23 contacts the first electrode portion 36 provided on the first face portion 22a of the dielectric member 22. Thus, the terminal member 23 and the first electrode portion 36 of the dielectric member 22 are electrically connected.

Since the two locking portions 38 of the terminal member 23 have elasticity, the dielectric member 22 is biased toward the second end side of the holder 21 in the axial direction by the terminal member 23. Consequently, the dielectric member 22 can be prevented from coming off from the holder 21. Further, the dielectric member 22 can be prevented or suppressed from being inclined in the holder 21, and the dielectric member 22 and the conductive member 26 can be in contact in a well-balanced state without being inclined. Consequently, a second assembly including the holder 21, dielectric member 22 and terminal member 23 is completed.

Then, the first assembly is inserted into the holder 21 from the second end side of the holder 21 in the axial direction. At this time, the terminal piece 53 of the elastic member 27 is projected from the first side of the holder 21 in the axial direction through the through-hole 34 of the holder 21 shown in FIGS. 7A and 7B. Then, the two engaging portions 44 of the holding member 24 which forms the first assembly are engaged with the two engaging holes 32 of the holder 21. Here, since the two engaging holes 32 are open over a predetermined length along the axial direction of the holder 21, the holding member 24 is supported for movement on the holder 21 along the axial direction. At this time, the curved face portion 26a of the conductive member 26 is positioned in proximity to the second face portion 22b of the dielectric member 22.

Further, when the engaging portions 44 of the holding member 24 are engaged with the engaging holes 32 of the holder 21, the coiled portion 51 of the elastic member 27 contacts the other end of the flange portion 31 in the axial direction of the holder 21.

At this time, the coiled portion 51 of the elastic member 27 is interposed in a somewhat compressed state between the holding member 24 and the flange portion 31 of the holder 21. Consequently, the elastic member 27 is normally biased in a direction in which the conductive member 26 is spaced away from the dielectric member 22. Therefore, in an initial state wherein no pressure is applied to the rod 12, even if the orientation of the variable capacitor 15 is reversed such that the conductive member 26 is positioned upwardly, i.e., above the dielectric member 22, the conductive member 26 and the dielectric member 22 can be prevented or suppressed from contacting each other. As a result, since the conductive member 26 and the dielectric member 22 can be prevented or suppressed from sticking to each other, deterioration of the conductive member 26 or the dielectric member 22 can be prevented and the durability of the variable capacitor 15 can be improved.

The assembly of the variable capacitor 15 shown in FIGS. 3 and 4 is completed as described above. However, the assembly of the variable capacitor 15 is not limited to that described above. In particular, the second assembly may be carried out before the first assembly.

[Operation of the Variable Capacitor]

Now, operation of the variable capacitor 15 is described with reference to FIGS. 2, 4 and 17.

Figure 17:
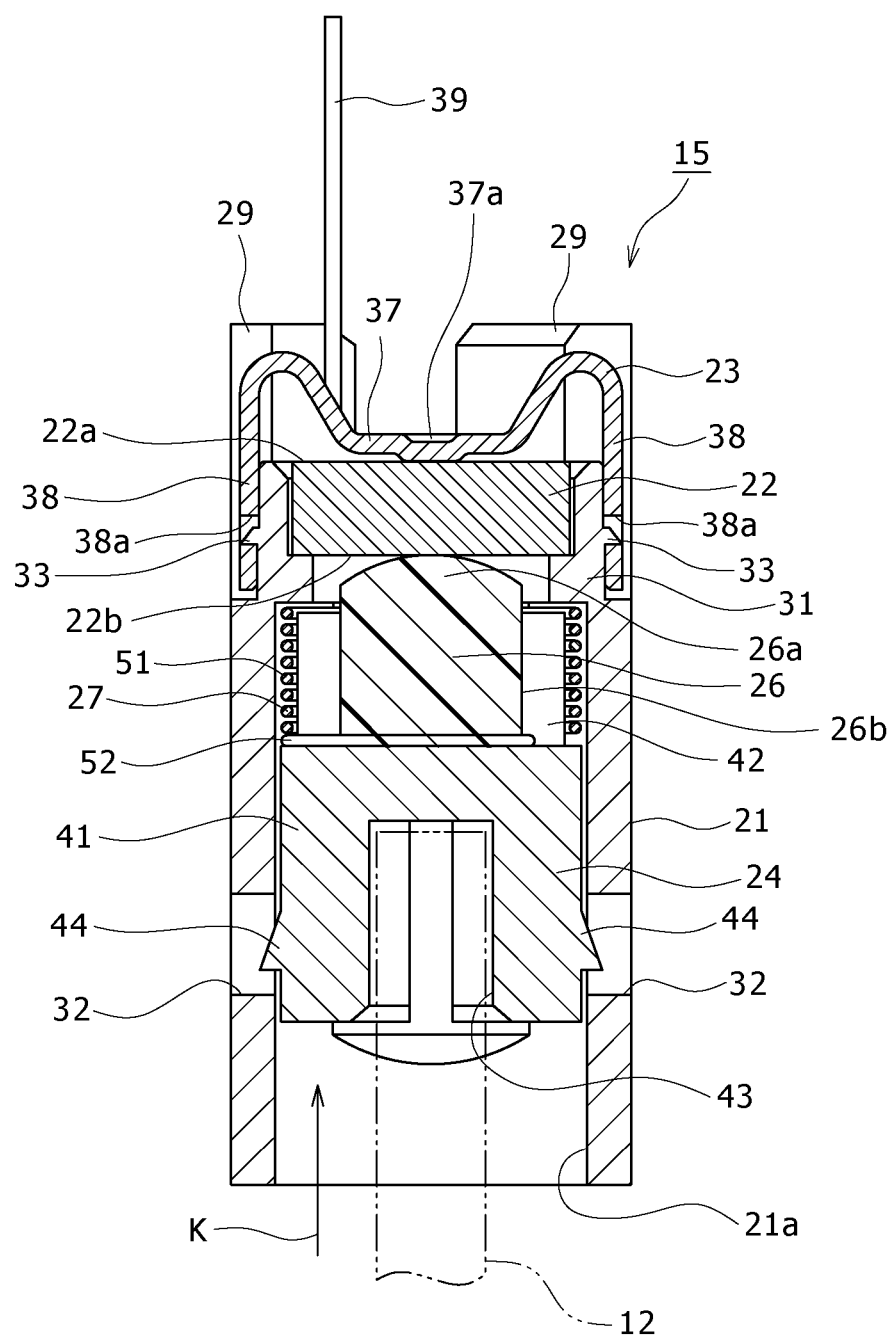
FIG. 17 is a sectional view of the variable capacitor of FIG. 3 when pressure is applied to a rod.

If pressure is applied to the pointing tip portion 12a of the rod 12 in the direction indicated by an arrow marked K shown in FIG. 17, the end of the stem portion 12b of the rod 12 presses the holding member 24 of the variable capacitor 15. Consequently, the holding member 24 moves to the first side of the holder 21 in the axial direction in the tubular hole 21a of the holder 21. Then, the curved face portion 26a of the conductive member 26 is brought into contact with the second face portion 22b of the dielectric member 22 to form a second electrode section. If the pressure is applied to the pointing tip portion 12a of the rod 12 further, the conductive member 26 is pressed and deformed into a flattened state by the second face portion 22b of the dielectric member 22. As a result, the contact area between the conductive member 26 and the second face portion 22b varies, and the capacitance value of the dielectric member 22 varies. Then, the capacitance value is detected between the terminal member 23 and the elastic member 27. Consequently, the pressure applied to the pointing tip portion 12a can be detected.

If the relative dielectric constant of the dielectric member is represented by ∈o, and the distance between the electrodes of the capacitor which oppose each other is represented by d, and the area of the electrodes is represented by S, the capacitance C of the capacitor is calculated as follows:

$$C = \in o(S/d)$$

In the state illustrated in FIG. 4, the conductive member 26 is physically spaced from the second face portion 22b of the dielectric member 22 and does not contact the second face portion 22b. Accordingly, the area S of the second electrode section is zero and the capacitance of the variable capacitor 15 is zero.

Then, where the conductive member 26 and the second face portion 22b contact each other as seen in FIG. 17, that is, where the area over which the first electrode portion 36 opposes the conductive member 26, is represented by S1, the capacitance C1 of the variable capacitor 15 is calculated as:

$$C1 = \in o(S1/d)$$

Further, where the area of the second electrode section when the conductive member 26 is elastically deformed is represented by S2 (S2>S1), the capacitance C2 of the variable capacitor 15 is calculated as:

$$C2 = \in o(S2/d)$$

Here, the elastic force of the elastic member 27 is set to be lower than the pressure to be applied to the rod 12 so that the elastic force of the elastic member 27 may not have an influence on the writing pressure characteristic to be detected by the variable capacitor 15. Further, since the second face portion 22b of the dielectric member 22 is in a mirror finished state, wear and tear of the conductive member 26 by repetitive contact between the second face portion 22b of the dielectric member 22 and the conductive member 26 can be reduced. Furthermore, since the second face portion 22b has a flat smooth face by mirror finish, the variable capacitor 15 has an improved initial sensitivity.

As shown in FIG. 4, if the pressure to the pointing tip portion 12a of the rod 12 is removed, the holding member 24 moves toward the second end side of the holder 21 in the axial direction in the tubular hole 21a of the holder 21 by the elastic force of the elastic member 27 and the restoring force of the curved face portion 26a of the conductive member 26. Then, the conductive member 26 is spaced away from the second face portion 22b of the dielectric member 22.

The holding member 24 is normally acted upon by force toward the second end side of the holder 21 in the axial direction originating from the elastic force of the elastic member 27 and the restoring force of the curved face portion 26a of the conductive member 26. Even if the pointing tip portion 12a of the rod 12 is directed upwardly, the rod 12 or the holding member 24 can be prevented or suppressed from being moved to the dielectric member 22 side in the holder 21 by its own weight. As a result, it is possible to prevent or suppress the conductive member 26 and the dielectric member 22 from contacting each other when no pressure is applied to the rod 12, and the responsiveness upon powering-down can be improved.

Further, since the two engaging portions 44 are provided on the holding member 24 and the two engaging holes 32 with which the two engaging portions 44 are engaged are provided on the holder 21, the engaging portions 44 contact the other end of the engaging holes 32 of the holder 21 in the axial direction, and consequently, the holding member 24 can be prevented from coming off from the second end side of the holder 21 under the elastic force of the elastic member 27.

[Detection Accuracy of the Pressure]

Figure 18A:
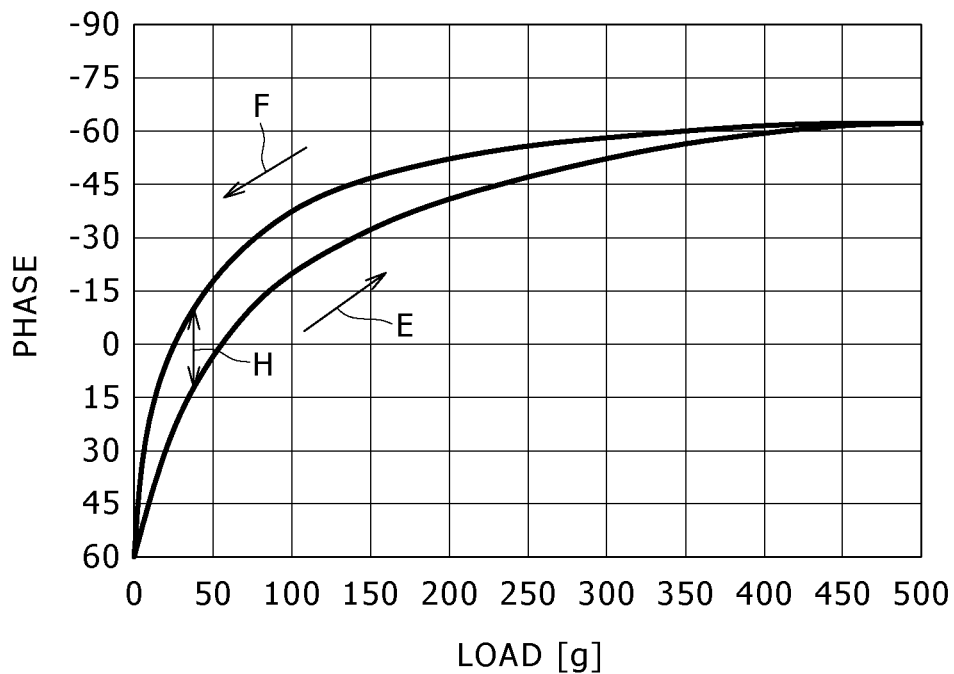
FIG. 18A is a graph illustrating a phase-load characteristic of the variable capacitor of FIG. 3.
Figure 18B:
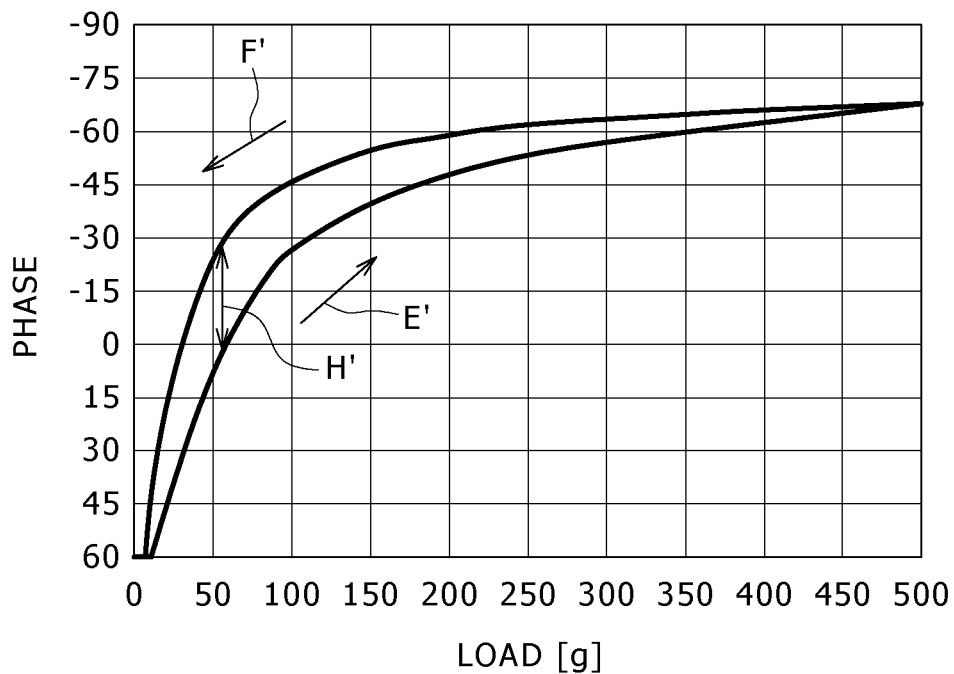
FIG. 18B is a graph illustrating a phase-load characteristic of a conventional variable capacitor shown in FIG. 26.

Now, the detection accuracy of pressure of the variable capacitor according to the present invention compared to a conventional variable capacitor is described with reference to FIGS. 18A and 18B.

In the variable capacitor 15 according to the present invention, the second face portion 22b of the dielectric member 22 is in a mirror finished state and the contacting portion of the conductive member 26 is formed in a curved face. As a result, a very low load or pressure of 1 g can be detected, as seen in FIG. 18A. Further, the elastic force of the elastic member 27 is set to, for example, less than 1 g, which is much lower than the pressure to be applied to the rod 12 so that the elastic force of the elastic member 27 does not have an influence on the writing pressure characteristic. In contrast, as seen in FIG. 18B, the conventional variable capacitor has an insensitive region of 10 g to 20 g and cannot detect very low pressure applied to the rod.

The conventional variable capacitor 200 does not have a structure for spacing the second electrode 203 away from the dielectric member 201. Further, it can be seen in FIG. 18B that, if a load is applied, the phase varies as indicated by a curve represented by an arrow marked E', but if the load is removed, the phase varies as indicated by the curve represented by another arrow marked F'. As seen in FIG. 18B, a greater hysteresis is exhibited, and the phase difference, represented by an arrow marked H', between an instance when a certain load is applied and an instance when the load is removed is great. As a result, it is difficult to control the writing pressure, and when the variable capacitor is incorporated in a position pointer, the user experience in writing or feeling the pen pressure of the position pointer is rather poor.

In contrast, in the variable capacitor 15, the conductive member 26 is biased away from the dielectric member 22 by the elastic force of the elastic member 27 and the restoring force of the curved face portion 26a of the conductive member 26. Further, it can be seen from FIG. 18A that, if a load is applied, the phase varies as indicated by a curve represented by an arrow marked E, and if the load is removed, then the phase varies as indicated by the curve represented by an arrow marked F. As seen in FIG. 18A, the hysteresis can be reduced from that of the variable capacitor 200, and the phase difference represented by the arrow marked H' between an instance when a certain load is applied and an instance when the load is removed can be reduced. As a result, the control of the writing pressure can be improved, and the user experience in writing or feeling the pen pressure of the position pointer can be improved.

[Circuit Configuration of the Position Detection Apparatus]

Figure 19:
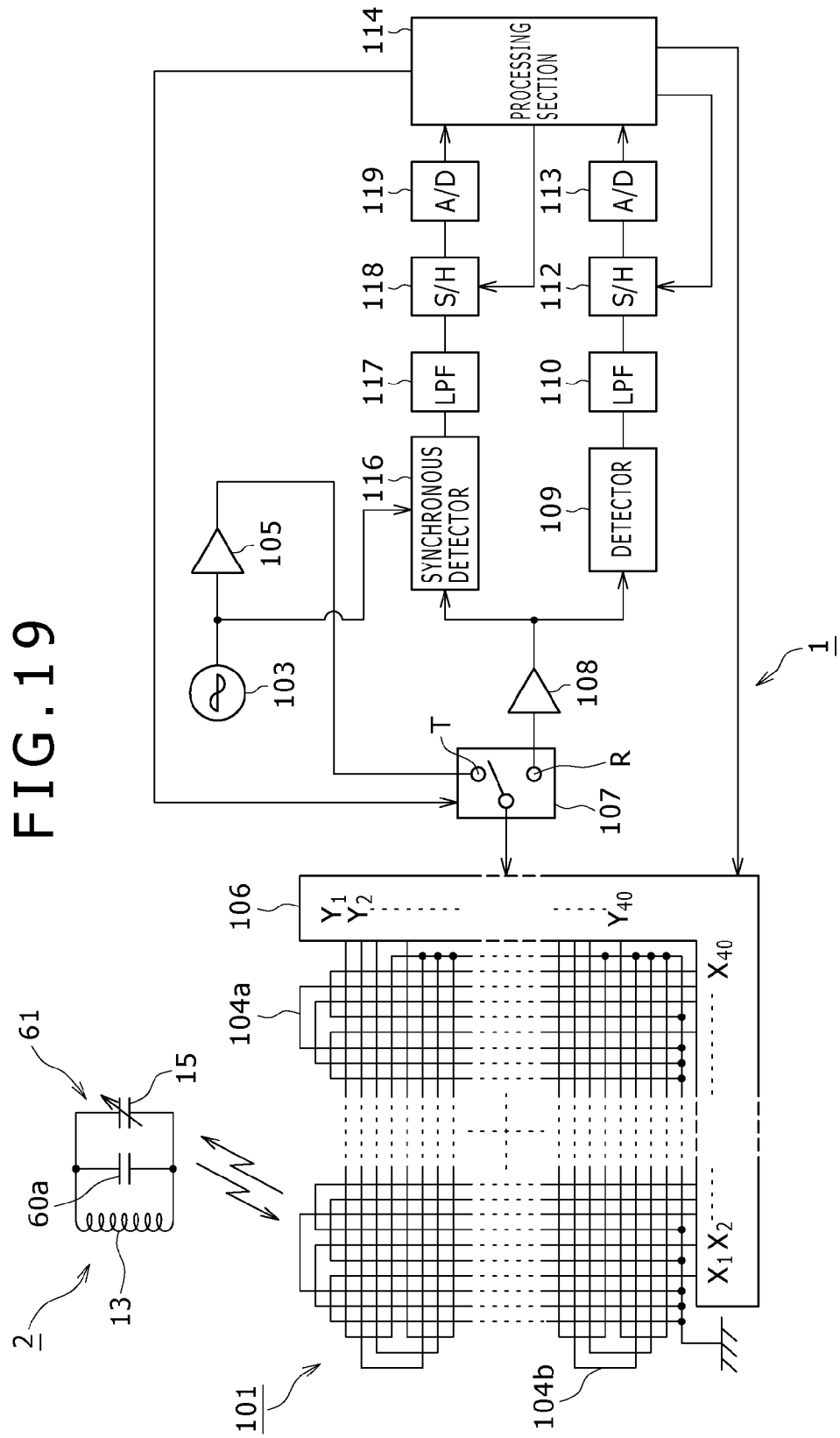
FIG. 19 is a schematic block diagram showing a circuit configuration of a position pointer and a position detection apparatus to which the present invention is applied.

Now, a particular circuit configuration of the position pointer 2 and the position detection apparatus 1 is described with reference to FIG. 19. FIG. 19 shows an example of a circuit configuration of the position pointer 2 and the position detection apparatus 1.

The position pointer 2 is represented by a resonance circuit 61 which includes the position indicating coil 13, the variable capacitor 15 connected to the position indicating coil 13, and a resonance capacitor 60a connected in parallel to the variable capacitor 15.

The position detection apparatus 1 includes an X-axis direction loop coil group 104a and a Y-axis direction loop coil group 104b provided in a laminated state to form a position detection coil 101. The loop coil groups 104a and 104b are each formed from 40 rectangular loop coils, for example. The loop coils of each of the loop coil groups 104a and 104b are disposed in an equidistantly spaced juxtaposed relationship and in a successively superposed relationship.

Further, the position detection apparatus 1 includes a selection circuit 106 to which the X-axis direction loop coil group 104a and the Y-axis direction loop coil group 104b are connected. The selection circuit 106 successively selects, for example, a loop coil of one of the two loop coil groups 104a and 104b.

The position detection apparatus 1 further includes an oscillator 103, a current driver 105, a switching connection circuit 107, a reception amplifier 108, a detector 109, a low-pass filter 110, an S/H (Sample Hold) circuit 112, an A/D (Analog to Digital) conversion circuit 113, a synchronous detector 116, another low-pass filter 117, another S/H circuit 118, another A/D conversion circuit 119, and a processing section 114.

The oscillator 103 generates an AC signal of a frequency f0 and supplies the generated AC signal to the current driver 105 and the synchronous detector 116. The current driver 105 converts the AC signal supplied thereto from the oscillator 103 into current and delivers the current to the switching connection circuit 107. The switching connection circuit 107 switches the connection destination to which a loop coil selected by the selection circuit 106 is to be connected under the control of the processing section 114 hereinafter described. The transmission side terminal T and the reception side terminal R are such connection destinations. The transmission side terminal T is connected to the current driver 105 and the reception side terminal R is connected to the reception amplifier 108.

The induced voltage generated in the loop coil selected by the selection circuit 106 is sent to the reception amplifier 108 through the selection circuit 106 and the switching connection circuit 107. The reception amplifier 108 amplifies the induced voltage supplied thereto from the loop coil and signals a resulting voltage to the detector 109 and the synchronous detector 116.

The detector 109 detects the induced voltage generated in the loop coil, that is, a reception signal, and signals the detected signal to the low-pass filter 110. The low-pass filter 110 has a cutoff frequency sufficiently lower than the frequency f0 mentioned hereinabove. The low-pass filter 110 converts the output signal of the detector 109 into a DC signal and then signals the DC signal to the S/H circuit 112. The S/H circuit 112 holds a voltage value of the output signal of the low-pass filter 110 at a predetermined timing, particularly during the receiving period, and signals the held voltage value to the A/D conversion circuit 113. The A/D conversion circuit 113 carries out analog to digital conversion of the output of the S/H circuit 112 and outputs the resulting digital signal to the processing section 114.

The synchronous detector 116 synchronously detects the output signal of the reception amplifier 108 with the AC signal from the oscillator 103 and signals a signal corresponding to the phase difference between the output signal of the reception amplifier 108 and the AC signal from the oscillator 103 to the low-pass filter 117. The low-pass filter 117 has a cutoff frequency sufficiently lower than the frequency f0. The low-pass filter 117 converts the output signal of the synchronous detector 116 into a DC signal and signals the DC signal to the S/H circuit 118. The S/H circuit 118 holds a voltage value of the output signal of the low-pass filter 117 at a predetermined timing and signals the held voltage value to the A/D conversion circuit 119. The A/D conversion circuit 119 carries out analog-digital conversion of the output of the S/H circuit 118 and outputs the resulting digital signal to the processing section 114.

The processing section 114 controls the components of the position detection apparatus 1. In particular, the processing section 114 controls selection of a loop coil by the selection circuit 106, switching of the switching connection circuit 107 and timings of the S/H circuits 112 and 118. The processing section 114 controls the X-axis direction loop coil group 104a and the Y-axis direction loop coil group 104b to transmit radio waves for a fixed transmission time period based on the input signals from the A/D conversion circuits 113 and 119.

In each of the loop coils of the X-axis direction loop coil group 104a and the Y-axis direction loop coil group 104b, an induced voltage is generated from radio waves transmitted from the position pointer 2. The processing section 114 calculates coordinate values of indication positions of the position pointer 2 in the X-axis direction and the Y-axis direction based on the voltage values of the induced voltages generated in the loop coils. Further, the processing section 114 detects writing pressure based on a phase difference between a transmitted radio wave and a corresponding received radio wave.

Figure 20:
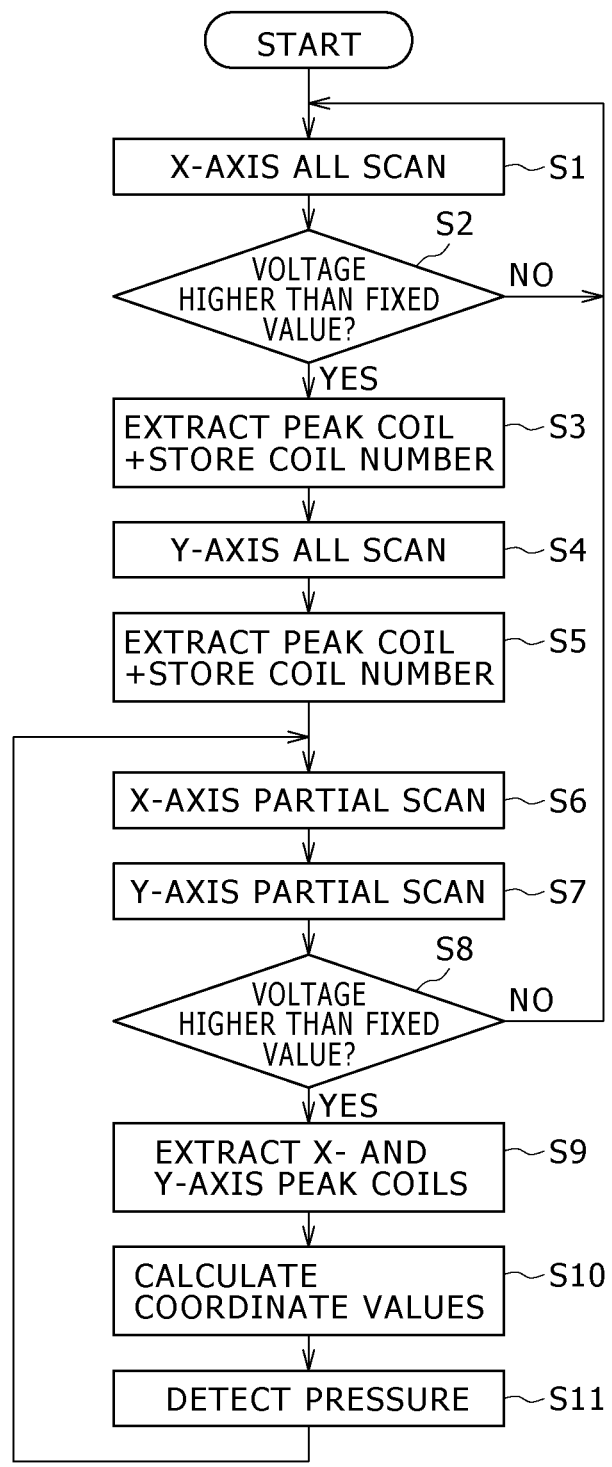
FIG. 20 is a flow chart illustrating processing by a processing section of the position detection apparatus shown in FIG. 19.

Now, operation of the position detection apparatus 1 with reference to the processing section 114 is described. FIG. 20 illustrates a flow of processing by the processing section 114.

First, the processing section 114 successively scans and selects the loop coils of the X-axis direction loop coil group 104a at step S1 (such successive scanning and selection is hereinafter referred to as all scanning or all scan).

The all scanning is described more particularly. The processing section 114 first signals information for selection of a first coil, for example, a loop coil X1, of the X-axis direction loop coil group 104a to the selection circuit 106 and sends a signal for selection of the transmission side to the switching connection circuit 107. Consequently, a sine wave signal of the frequency f0 is supplied from the oscillator 103 to the loop coil X1, and the loop coil X1 generates a radio wave of the frequency f0. At this time, if the position pointer 2 is positioned in proximity to or in contact with the top face 300a of the position detection apparatus 1, current generated from the loop coil X1 excites the resonance circuit 61 having the position indicating coil 13. As a result, an induced voltage of the frequency f0 is generated in the resonance circuit 61.

After the processing section 114 signals a signal for selecting the transmission side terminal T to the switching connection circuit 107 for a fixed period of time, it sends a signal for selecting the reception side terminal R to the switching connection circuit 107 so that the radio wave to be generated from the loop coil X1 is extinguished. Thereupon, the induced voltage generated in the resonance circuit 61 with the resonance capacitor 60a and the variable capacitor 15 gradually attenuates in response to the loss thereof, and the resonance circuit 61 generates a radio wave of the frequency f0. This radio wave reversely excites the loop coil X1 described above so that an induced voltage is generated in the loop coil X1.

After the processing section 114 sends the signal for selecting the reception side terminal R to the switching connection circuit 107 for the fixed period of time, it signals information for selecting a second loop coil, for example, a loop coil X2, of the X-axis direction loop coil group 104a to the selection circuit 106. Thereafter, the processing section 114 sends a signal for selecting the reception side terminal R to the switching connection circuit 107, so that transmission and reception of a radio wave similar to that described above is carried out.

Thereafter, the processing section 114 executes a similar processing routine to successively scan and select the 3rd to 40th loop coils, for example, the loop coils X3 to X40, of the X-axis direction loop coil group 104a. As a result, transmission and reception of a radio wave is carried out by the loop coils X3 to X40.

In the processing flow at step S1, the processing section 114 need not select all loop coils of the X-axis direction loop coil group 104a, but may instead suitably sample the loop coils to be selected such that it selects every other one of the loop coils or every third one of the loop coils. Alternatively, transmission and reception of a radio wave for the loop coils may be carried out several times. Further, although the transmission time period for each loop coil and the reception time period for each loop coil must be equal, the transmission time period need not be equal to the reception time period.

The induced voltage generated in each loop coil of the X-axis direction loop coil group 104a during the reception period described above, that is, the reception signal, is detected and converted into a DC signal by the detector 109 and then smoothed by the low-pass filter 110. Then, the reception signal is held at a predetermined timing by the S/H circuit 112 and converted by the A/D conversion circuit 112 into a digital value, which is sent to the processing section 114.

Figure 21:
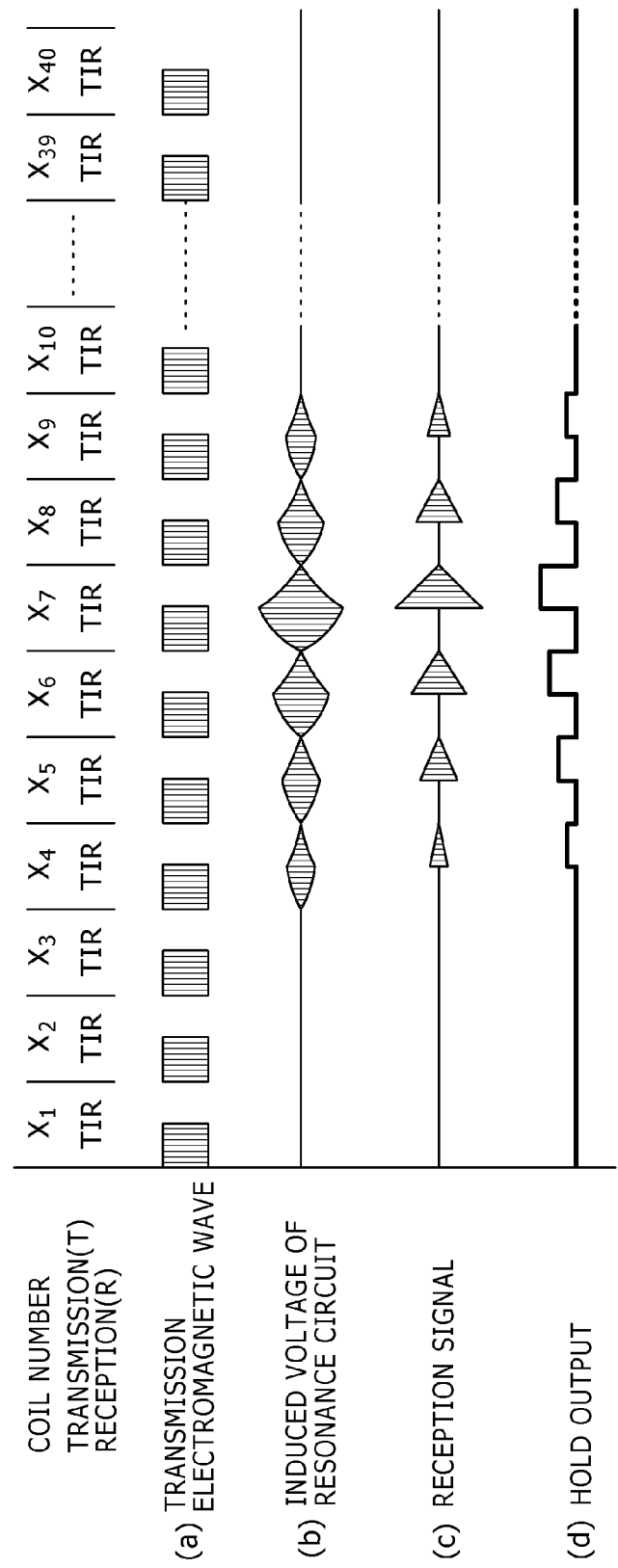
FIG. 21 is a waveform diagram illustrating an example of waveforms of components of the position detection apparatus shown in FIG. 19 when the position detection apparatus carries out X-axis all scanning.

FIG. 21 illustrates an example of waveforms at several components of the position detection apparatus 1 in the X-axis all scanning at step S1 of FIG. 20 described hereinabove. Referring to FIG. 21, a waveform (a) represents a radio wave transmitted from the position detection coil 101; a waveform (b) represents an induced voltage generated in the resonance circuit 61; a waveform (c) represents a reception signal received by the position detection apparatus 1; and a waveform (d) represents an output signal of the S/H circuit 112.

The output level of the S/H circuit 112 is based upon the distance between the position pointer 2 and the loop coil. Therefore, the processing section 114 decides whether or not the maximum value of the output level of the S/H circuit 112 is higher than a fixed value set in advance at step S2, i.e. whether or not the position pointer 2 is within an effective reading height of the position detection apparatus 1.

If it is decided by the processing at step S2 that the maximum value of the output level of the S/H circuit 112 is not higher than the fixed value set in advance, that is, the position pointer 2 is not within the effective reading height ("NO" at step S2), the process returns to step S1.

If it is decided at step S2 that the position pointer 2 is within the effective reading height ("YES" at step S2), the processing section 114 extracts that loop coil (hereinafter referred to as peak coil) at which the maximum value is obtained from the loop coils X1 to X40 and stores the number of the peak coil (in the present example, "X7") at step S3.

At step S4, the processing section 114 successively scans and selects (all scanning) the loop coils of the Y-axis direction loop coil group 104b and carries out transmission and reception of radio waves of the loop coils of the Y-axis direction loop coil group 104b.

Figure 22:
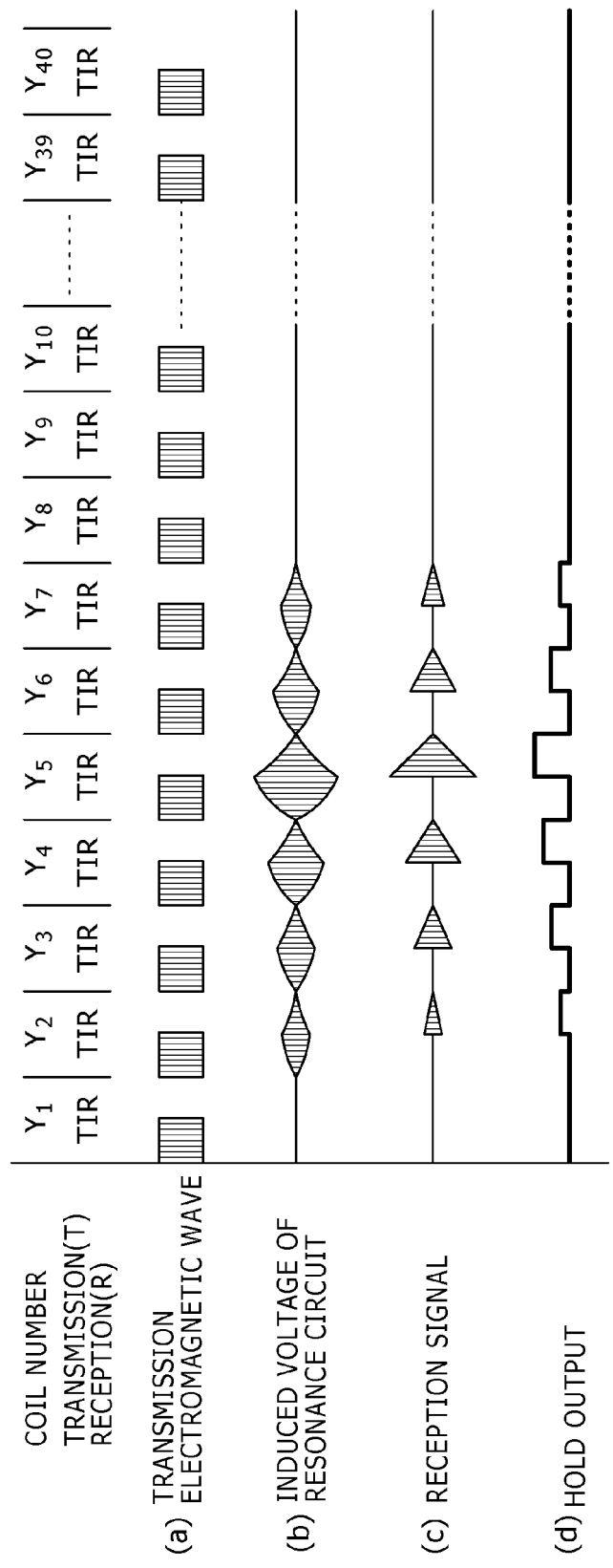
FIG. 22 is a waveform diagram illustrating an example of waveforms of the components of the position detection apparatus shown in FIG. 19 when the position detection apparatus carries out Y-axis all scanning.

FIG. 22 illustrates an example of waveforms of several components of the position detection apparatus 1 in the Y-axis all scanning operation. Referring to FIG. 22, signals of waveforms (a), (b), (c) and (d) are similar to those of the waveforms (a), (b), (c) and (d) of FIG. 21, respectively.

The processing section 114 extracts that loop coil (hereinafter referred to as peak coil) from which a maximum value is obtained from the loop coils Y1 to Y40 and stores the number of the extracted loop coil (in the present example, "Y5") at step S5.

Then, the processing section 114 carries out a radio wave transmission to, and reception from, a predetermined number of loop coils adjacent to and around the peak coil within the X-axis direction loop coil group 104a (for example, five loop coils). When a radio wave is transmitted, that is, when the transmission side terminal T is selected by the switching connection circuit 107, the processing section 114 always selects the peak coil (in the present example, the "loop coil X7"). When a radio wave is received, that is, when the reception side terminal R is selected by the switching connection circuit 107, the processing section 114 successively scans and selects (partial scanning) the loop coils (in the present example, five loop coils) in the ascending order (or in the descending order) at step S6.

When the X-axis partial scanning operation comes to an end, the processing section 114 carries out transmission and reception of a radio wave to and from a predetermined number of, for example, five, loop coils around the peak coil from within the Y-axis direction loop coil group 104b. When a radio wave is transmitted, that is, when the transmission side terminal T is selected by the switching connection circuit 107, the processing section 114 always selects the peak coil (in the present example, the "loop coil Y5"). When a radio wave is received, that is, when the reception side terminal R is selected by the switching connection circuit 107, the processing section 114 successively scans and selects (partial scanning) the loop coils (in the present example, five loop coils) in the ascending order (or in the descending order) at step S7.

Figure 23:
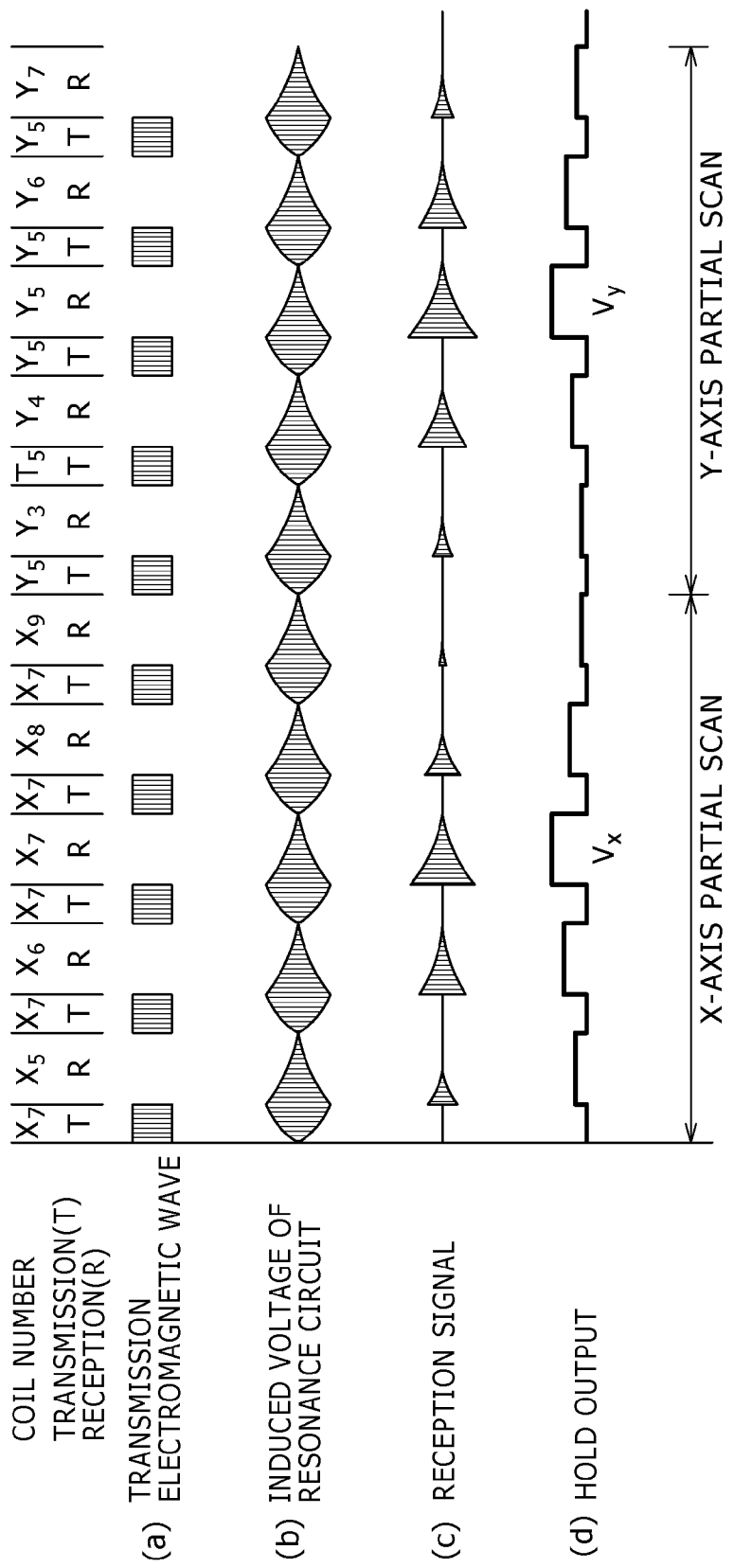
FIG. 23 is a waveform diagram illustrating an example of waveforms of the components of the position detection apparatus shown in FIG. 19 when the position detection apparatus carries out X-axis partial scanning and Y-axis partial scanning.

FIG. 23 illustrates an example of waveforms at the several components of the position detection apparatus 1 in the X-axis partial scanning operation and the Y-axis partial scanning operation. Referring to FIG. 23, signals represented by waveforms (a), (b), (c) and (d) are similar to the waveforms (a), (b), (c) and (d) of FIG. 21, respectively.

When the Y-axis partial scanning operation comes to an end, the processing section 114 decides whether or not the maximum values of the induced voltage obtained by the processing at steps S6 and S7 are higher than fixed values set in advance at step S8, i.e. whether or not the position pointer 2 is within the effective reading height of the position detection apparatus 1.

If it is decided at step S8 that the maximum value of the output level of the S/H circuit 112 is not higher than the fixed value set in advance, that is, the position pointer 2 is not within the effective reading height ("NO" at step S8), the process returns to step S1.

If it is decided at step S8 that the position pointer 2 is within the effective reading height ("YES" at step S8), the processing section 114 extracts the peak coil in the X-axis direction and the peak coil in the Y-axis direction with which the maximum induced voltages are obtained and stores the numbers of the peak coils at step S9.

At step S10, the processing section 114 extracts a plurality of induced voltages in the descending order of the level, along each of the X-axis direction and the Y-axis direction, (for example, three voltage signals) and determines coordinate values in the X-axis direction and the Y-axis direction of the indicated position by the position pointer 2 based on the extracted signals. The coordinate values in the X-axis direction and the Y-axis direction may be calculated by executing a well-known coordinate calculation method disclosed in Japanese Patent No. 2131145 of the assignee of the present invention.

At step S11, the processing section 114 calculates the writing pressure from the level of the signal corresponding to the phase difference between the transmitted radio wave and the received radio wave. Thereafter, as long as the position pointer 2 remains within the effective reading height, the processing section 114 repeats the processing steps S6 to S11. If the processing section 114 decides that the position pointer 2 is not within the effective reading height, the process returns to step S1.

In this manner, the position of the position pointer 2 placed in proximity to the position detection apparatus 1 can be detected by the processing section 114. Besides, by detecting the phase of the received signal, the position detection apparatus 1 can acquire information of the writing pressure value of the position pointer 2.

Figure 24:
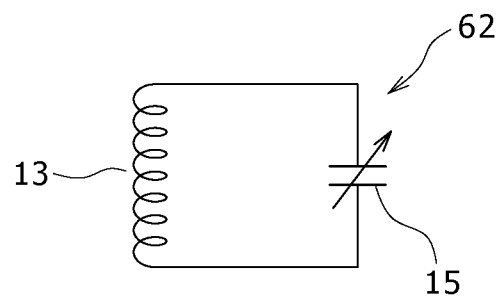
FIG. 24 is an electric circuit diagram showing another form of a resonance circuit provided in the position pointer of FIG. 19.

FIG. 24 shows a second form of the resonance circuit provided in the position pointer 2. Referring to FIG. 24, the resonance circuit 62 includes the position indicating coil 13 and the variable capacitor 15. In the resonance circuit 61 shown in FIG. 19, which is the first form of the resonance circuit, the variable capacitor 15 and the resonance capacitor 60a are connected in parallel to form a parallel resonance circuit. However, the resonance circuit can also be formed using only the variable capacitor 15, as seen in FIG. 24.

Figure 25:
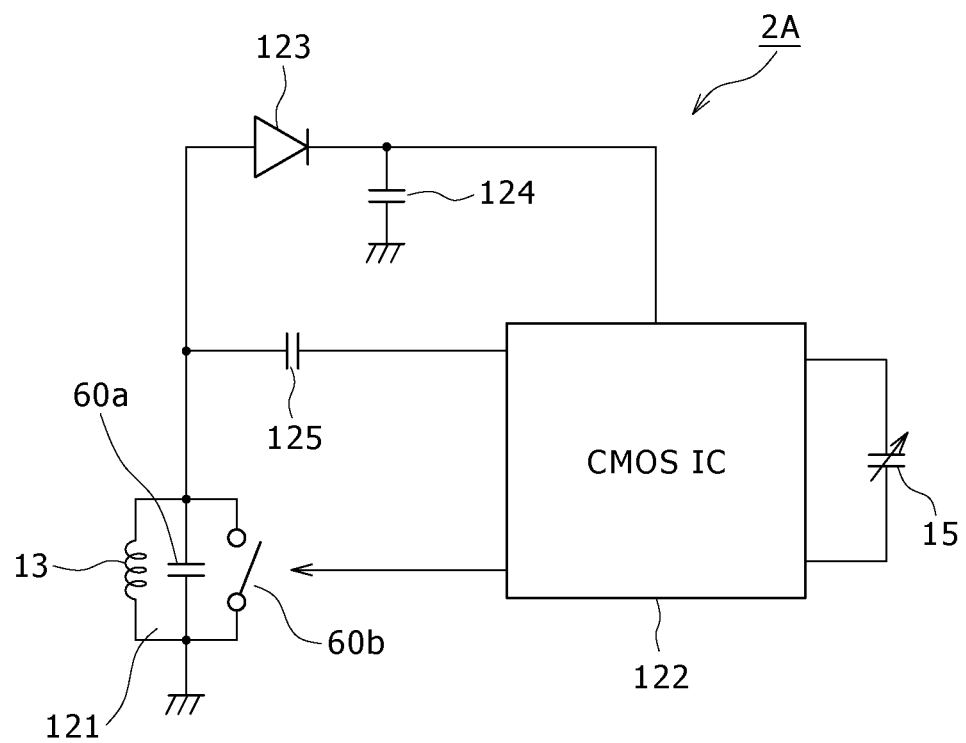
FIG. 25 is an electric circuit diagram of another position pointer according to another embodiment of the present invention.
Figure 26A:
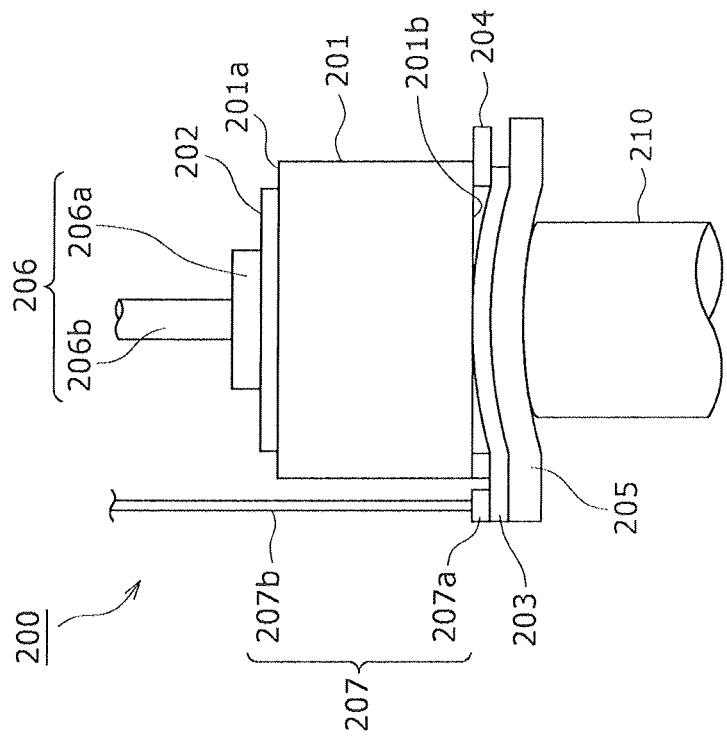
FIGS. 26A and 26B schematically illustrate a conventional variable capacitor in an initial state and in a state when pressure is applied to a rod, respectively.
Figure 26B:
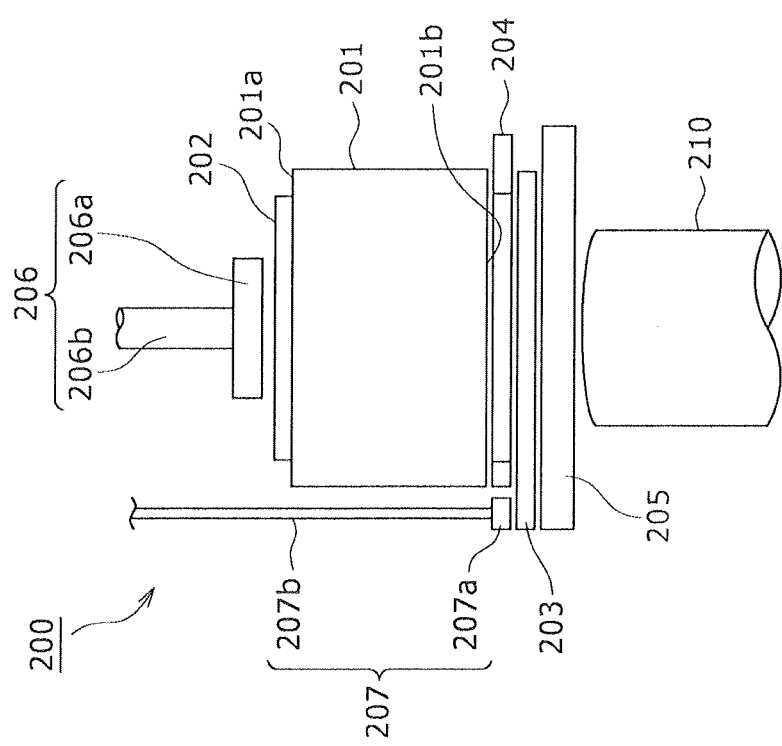

Now, a position pointer according to a second embodiment of the present invention is described with reference to FIG. 25. FIG. 25 shows an electric circuit of the position pointer according to the second embodiment of the present invention.

The position pointer 2A includes a resonance circuit 121 which resonates with a frequency $f_0$ signaled from a position detection coil 101 (refer to FIG. 19) provided in the position detection apparatus 1. The resonance circuit 121 includes a position indicating coil 13 and a resonance capacitor 60a. Further, an integrated circuit (IC) 122 according to the known CMOS (Complementary Metal Oxide Semiconductor) technique is disposed on a circuit board of the position pointer 2A. The integrated circuit 122 is driven by a driving power supply formed from a diode 123 and a capacitor 124.

The diode 123 is connected to the resonance circuit 121. An AC voltage is generated in the resonance circuit 121 based on an excitation signal supplied from the position detection coil 101 and is applied to the diode 123. This AC voltage is rectified and converted into DC current by the diode 123 and the capacitor 124 and supplied as a driving power supply to the integrated circuit 122. Further, the signal generated in the resonance circuit 121 is supplied also to the integrated circuit 122 through a capacitor 125. The integrated circuit 122 generates a clock signal to be used for carrying out transfer of signals between the position pointer 2A and the position detection apparatus 1 and a clock signal for detection of the writing pressure based on the signal supplied through the capacitor 125.

The capacitance of the variable capacitor 15 varies in response to the writing pressure applied to the rod 12 (refer to FIG. 2). The variable capacitor 15 is connected to a resistor (not shown) to form a time constant circuit. Accordingly, when the capacitance of the variable capacitor 15 varies in response to the writing pressure, the time constant of the time constant circuit varies. The time constant is converted into a writing pressure value of a predetermined number of bits, for example, of 8 bits, by the integrated circuit 122.

The writing pressure data, that is, the writing pressure value of 8 bits, determined in this manner is output one by one bit to the resonance circuit 121 from the integrated circuit 122 synchronously with the clock signal used for transfer of a signal between the position detection apparatus 1 and the position pointer 2A described above. The output of the integrated circuit 122 is used to control switching between ON and OFF of the switch 60b connected in parallel to the resonance circuit 121. Accordingly, when the switch 60b is off, the position detection apparatus 1 detects a signal from the position pointer 2A. However, when the switch 60b is on, since the resonance circuit 121 is short-circuited, the position detection apparatus 1 cannot detect a signal signaled from the position pointer 2A.

Consequently, the position detection apparatus 1 transmits an excitation signal for supplying power to the position pointer 2A for a fixed period of time from the position detection coil 101 and thereafter detects a signal sent from the position pointer 2A to determine the writing pressure applied to the rod 12.

The present disclosure is not limited to the embodiments described above and shown in the drawings, but can be modified in various ways without departing from the subject matter of the present disclosure. For example, in the embodiments described above, a coil spring is applied to the terminal member. However, not only a coil spring, but also various members having elasticity, such as a leaf spring, can be applied to the terminal member. Further, while the connecting portion of the elastic member contacts the bottom face portion of the conductive member, the elastic member may be formed so as to contact a side face portion of the conductive member. Further, while a single dielectric member is used, two or more dielectric members may also be used.

What is claimed is:

1. A position pointer, comprising:
   a substantially tubular housing having an opening at one end;
   a substantially bar-like rod disposed in the housing such that one end thereof projects from the opening of the housing; and
   a variable capacitor having a capacitance value which varies in response to pressure applied thereto through the rod, the variable capacitor including
   a dielectric member having a first face portion and a second face portion opposite the first face portion,
   a first electrode section disposed on the first face portion of the dielectric member,
   a conductive member disposed facing the second face portion of the dielectric member, the conductive member forming a second electrode section when brought into contact with the second face portion of the dielectric member, wherein a contact area between the conductive member and the second face portion forming the second electrode section varies depending on the pressure applied thereto through the rod,
   a holding member coupled to the conductive member, and
   an elastic member comprising a coil made of conductive material, at least a portion of the elastic member being interposed between the conductive member and the holding member to be electrically connected to the conductive member and to be attached to the holding member, and the elastic member being arranged such that elasticity of the coil biases the conductive member away from the second face portion.

2. The position pointer according to claim 1, wherein the elastic member comprises:
   a first terminal portion formed at a first end of the coil, and
   a second terminal portion formed by bending a second end of the coil to an inner side of the coil in a radial direction,
   wherein the conductive member and the second terminal portion are electrically connected to each other.

3. The position pointer according to claim 2, wherein the elastic member is attached to the holding member with the second terminal portion thereof interposed between the conductive member and the holding member.

4. The position pointer according to claim 3, wherein the conductive member is coupled to the holding member by being fitted in the holding member, and
   wherein the elastic member is wound on an outer periphery side of the holding member.

5. The position pointer according to claim 4, wherein the holding member has a recessed portion for receiving the conductive member therein, wherein the recessed portion has at least one cutaway portion with which the second terminal section is engaged.

6. The position pointer according to claim 5, further comprising a substantially tubular holder for accommodating the dielectric member, elastic member, conductive member and holding member therein, the holder having a projection formed on an inner wall thereof so as to extend to the inner side of the holder in a radial direction, the projection defining a position of the dielectric member in an axial direction of the holder and a position of the elastic member.

7. The position pointer according to claim 6, wherein the holder includes:
   a hollow portion configured to accommodate the dielectric member, conductive member, elastic member and holding member,
   a wall portion, and
   a first engaging portion provided on the wall portion,
   wherein the holding member is engaged with the first engaging portion such that the position of the holding member is defined by the housing.

8. The position pointer according to claim 7, wherein the housing and the holder are molded integrally with each other.

9. The position pointer according to claim 1, further comprising a terminal member having a contact portion that contacts the first electrode section and a second engaging portion having elasticity, the second engaging portion of the terminal member being engaged with the housing and biasing the contact portion against the first electrode section.

10. The position pointer according to claim 1, wherein the second face portion of the dielectric member is in a mirror finished state.

11. The position pointer according to claim 1, wherein the at least a portion of the elastic member includes an end of the coil that is bent to an inner side of the coil in a radial direction.

12. The position pointer according to claim 11, wherein the end of the coil that is bent to an inner side of the coil in a radial direction is further bent, perpendicularly, to extend in a winding direction of the coil to penetrate into the conductive member.

13. An inputting apparatus, comprising:
   a position pointer including a housing, a substantially bar-like rod disposed in the housing such that an end thereof projects from the housing, and a variable capacitor having a capacitance value which varies in response to pressure applied thereto through the rod; and
   a position detection apparatus having a detection face for detecting the position indicated by the end of the rod,
   wherein the variable capacitor includes:
      a dielectric member having a first face portion and a second face portion opposite the first face portion,
      a first electrode section disposed on the first face portion of the dielectric member,
      a conductive member disposed facing the second face portion of the dielectric member, the conductive member forming a second electrode section when brought into contact with the second face portion of the dielectric member, wherein a contact area between the conductive member and the second face portion forming the second electrode section varies depending on the pressure applied thereto through the rod,
      a holding member coupled to the conductive member, and
      an elastic member comprising a coil made of conductive material, at least a portion of the elastic member being interposed between the conductive member and the holding member to be electrically connected to the conductive member and to be attached to the holding member, and the elastic member being arranged such that elasticity of the coil biases the conductive member away from the second face portion.

* * * * *